US009552130B2

(12) United States Patent
Momchilov

(10) Patent No.: US 9,552,130 B2
(45) Date of Patent: Jan. 24, 2017

(54) SPEECH RECOGNITION SUPPORT FOR REMOTE APPLICATIONS AND DESKTOPS

(71) Applicant: Citrix Systems, Inc., Fort Lauderdale, FL (US)

(72) Inventor: Georgy Momchilov, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 342 days.

(21) Appl. No.: 13/888,495

(22) Filed: May 7, 2013

(65) Prior Publication Data

US 2013/0298033 A1 Nov. 7, 2013

Related U.S. Application Data

(60) Provisional application No. 61/643,663, filed on May 7, 2012.

(51) Int. Cl.

*G06F 3/048* (2013.01)
*G06F 3/0481* (2013.01)
*G06F 3/16* (2006.01)
*G06F 3/0482* (2013.01)

(52) U.S. Cl.

CPC ........... *G06F 3/0481* (2013.01); *G06F 3/0482* (2013.01); *G06F 3/167* (2013.01); *G06F 2203/0381* (2013.01)

(58) Field of Classification Search

CPC ........... G06F 3/16; G06F 3/167; G06F 3/0481
See application file for complete search history.

(56) References Cited

U.S. PATENT DOCUMENTS 5,602,729 A * 2/1997 Krueger .............. G06F 11/3664 709/224
8,365,144 B1 * 1/2013 Webb ...................... G06F 3/048 709/224
2003/0144846 A1 * 7/2003 Denenberg et al. .......... 704/277
2003/0158736 A1 * 8/2003 James et al. ............... 704/270.1
2009/0187410 A1 * 7/2009 Wilpon ................... G10L 15/22 704/270.1
2011/0054895 A1 * 3/2011 Phillips ................. G10L 15/075 704/235

(Continued)

OTHER PUBLICATIONS

ISR for International Application No. PCT/US2013/039927 dated Nov. 12, 2013.

(Continued)

*Primary Examiner* — Rashawn Tillery
(74) *Attorney, Agent, or Firm* — Banner & Witcoff, Ltd.

(57) ABSTRACT

An application may be hosted for utilization by a remote computing platform. User interface (UI) elements of a UI generated by the hosted application may be identified. Proxy UI elements may be generated. Each of the proxy UI elements may correspond to one or more of the identified UI elements. A transcript of an audio sample may be processed. The audio sample may comprise an utterance of a user of the remote computing platform. The transcript of the audio sample may comprise at least one word corresponding to one or more of the proxy UI elements. A functionality of the hosted application may be invoked. The invoked functionality may correspond to one or more of the UI elements corresponding to the one or more of the proxy UI elements.

16 Claims, 18 Drawing Sheets

(56) References Cited

U.S. PATENT DOCUMENTS

| | | | | |
|---|---|---|---|---|
| 2011/0067059 | A1* | 3/2011 | Johnston | G10L 15/30 725/39 |
| 2011/0301943 | A1 | 12/2011 | Patch | |
| 2012/0084663 | A1* | 4/2012 | Momchilov et al. | 715/744 |
| 2012/0101812 | A1* | 4/2012 | Reding et al. | 704/201 |
| 2013/0219277 | A1* | 8/2013 | Wang et al. | 715/728 |
| 2014/0237368 | A1* | 8/2014 | Canitz | 715/729 |

OTHER PUBLICATIONS

Extended European Search Report dated Nov. 30, 2015, for European Patent Application No. 13787809.6.

* cited by examiner

500
Speech Recognition Platform
506
Host Platform
UI Module
Hosted App.
OS
504
520
518
516
Network
508
Remote Platform
Receiver Module
Voice Module
OS
502
514
512
510

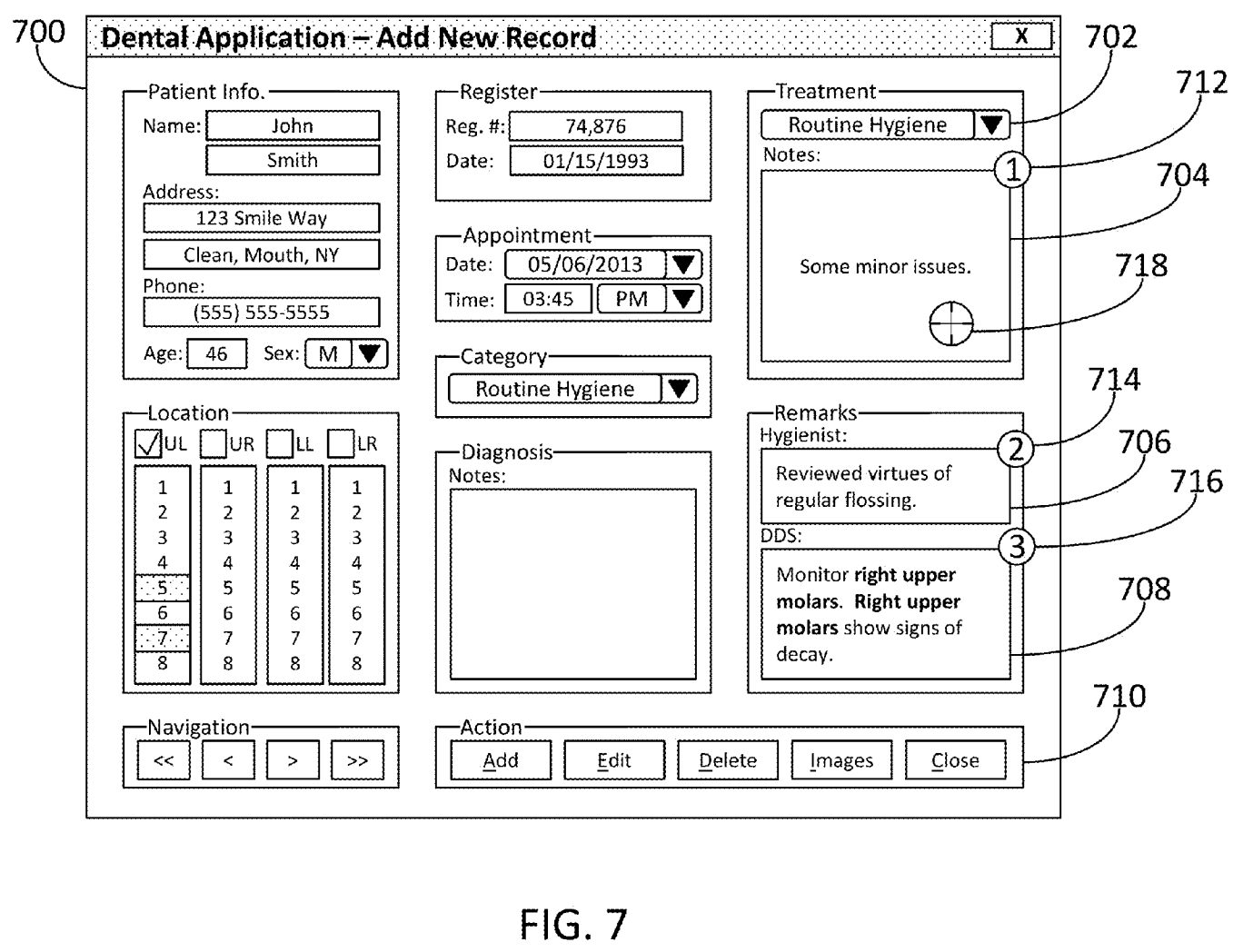

Dental Application – Add New Record

X

Patient Info.
Name: John
Smith
Address: 123 Smile Way
Clean, Mouth, NY
Phone: (555) 555-5555
Age: 46 Sex: M Register
Reg. #: 74,876
Date: 01/15/1993

Appointment
Date: 05/06/2013
Time: 03:45 PM

Category
Routine Hygiene

Treatment
Routine Hygiene
Notes:
Some minor issues.

Location
UL UR LL LR
1 2 3 4 5 6 7 8
1 2 3 4 5 6 7 8
1 2 3 4 5 6 7 8
1 2 3 4 5 6 7 8

Diagnosis
Notes:

Remarks
Hygienist:
Reviewed virtues of regular flossing.
DDS:
Monitor right upper molars. Right upper molars show signs of decay.

Navigation
<< < > >>

Action
Add Edit Delete Images Close 700 702 704 706 708 710 712 714 716 718
1 2 3

FIG. 7

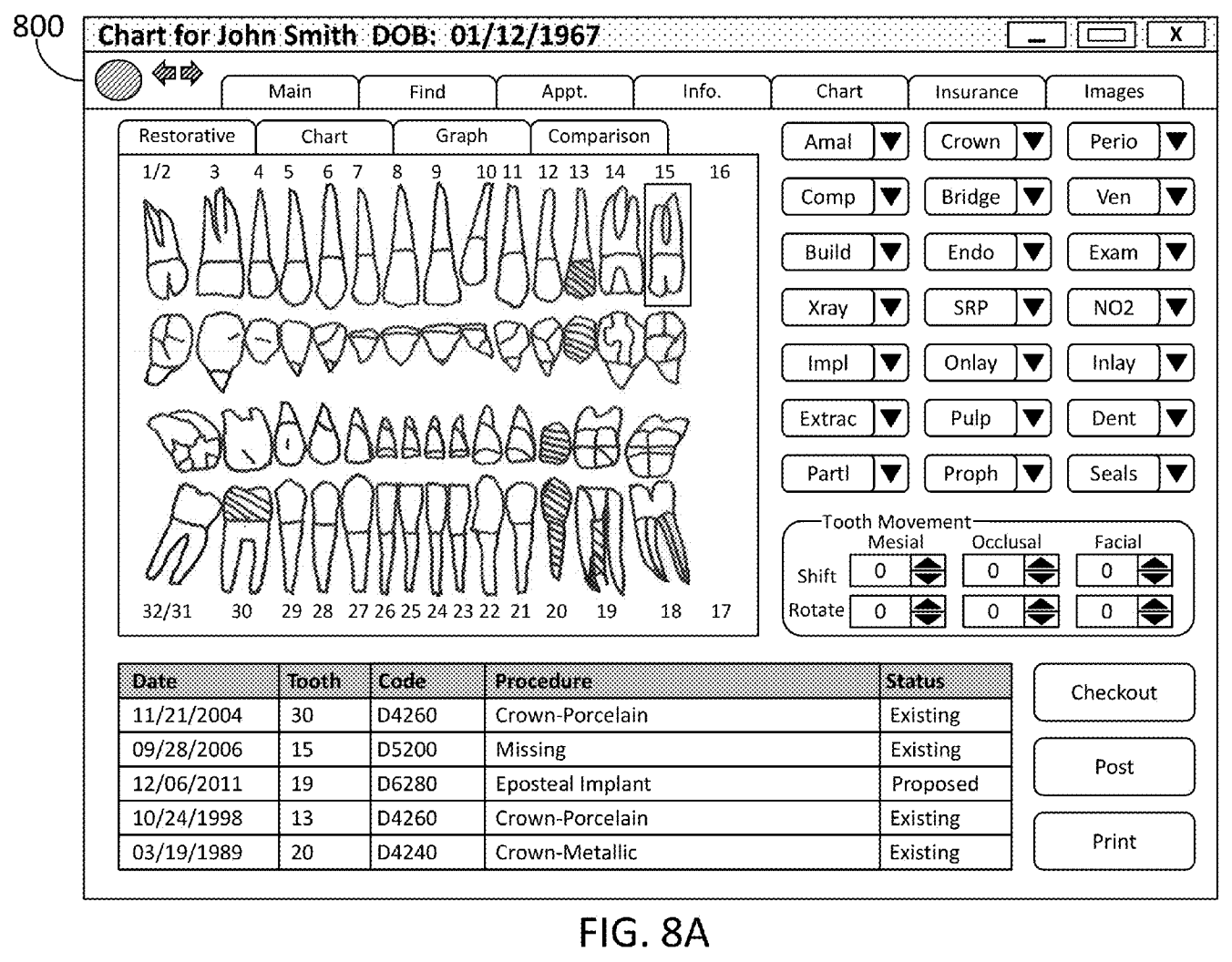

| Date | Tooth | Code | Procedure | Status |
|---|---|---|---|---|
| 11/21/2004 | 30 | D4260 | Crown-Porcelain | Existing |
| 09/28/2006 | 15 | D5200 | Missing | Existing |
| 12/06/2011 | 19 | D6280 | Eposteal Implant | Proposed |
| 10/24/1998 | 13 | D4260 | Crown-Porcelain | Existing |
| 03/19/1989 | 20 | D4240 | Crown-Metallic | Existing |

FIG. 8A

SPEECH RECOGNITION SUPPORT FOR REMOTE APPLICATIONS AND DESKTOPS

PRIORITY CLAIM

This application claims priority to U.S. Provisional Patent Application Ser. No. 61/643,663, filed May 7, 2012, and entitled "Speech Recognition Support for Remote Applications and Desktops," the disclosure of which is incorporated by reference herein in its entirety and made part hereof.

BACKGROUND

Remote applications and/or remote desktops are widely utilized for both consumer and enterprise applications. Consumers prefer remote applications or desktops because they offer a secure and simple alternative to local customized installations, which may prove technically demanding or vulnerable to malicious software. Enterprise administrators often opt for remote applications or desktops over local installations due to their scalability, security, and platform-agnostic accessibility.

Speech recognition technology is playing an increasingly prominent role in modern software applications. As speech recognition technology has improved in accuracy, hardware manufacturers have leveraged its increasing precision to downsize hardware platforms, for example, by removing alternative input devices (e.g., keyboards and touch devices) that were once commonplace. Moreover, certain applications are particularly well suited for speech recognition, for example, applications which will be utilized by users who will likely need to have their hands free to perform other tasks (e.g., in the medical or dental context).

Accordingly, a need exists for speech recognition support for remote applications and desktops.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various aspects described further herein in a simplified form as a prelude to the more detailed description provided below.

According to one or more aspects described herein, an application may be hosted for utilization by a remote computing platform. User interface (UI) elements of a UI generated by the hosted application may be identified. Proxy UI elements may be generated. Each of the proxy UI elements may correspond to one or more of the identified UI elements. A transcript of an audio sample may be processed. The audio sample may comprise an utterance of a user of the remote computing platform. The transcript of the audio sample may comprise at least one word corresponding to one or more of the proxy UI elements. A functionality of the hosted application may be invoked. The invoked functionality may correspond to one or more of the UI elements corresponding to the one or more of the proxy UI elements.

In some embodiments, the transcript of the audio sample may include text to be inserted in a field of the UI generated by the hosted application. In such embodiments, the text included in the transcript of the audio sample may be inserted in the field of the UI generated by the hosted application. In some embodiments, contextual text corresponding to a position in the field of the UI generated by the hosted application may be identified. The position may correspond to a location of the field where the text is to be inserted. The contextual text may be communicated to the remote computing platform. A sliding window stored at the remote computing platform may be updated with the contextual text. Prior to the text to be inserted being inserted, the sliding window may be used to refine the text to be inserted.

In some embodiments, a unified set of words stored at the remote computing platform may be updated. The unified set of words may include at least one word corresponding to a speech recognition functionality of an application or program executed locally on the remote computing platform. The unified set of words may also include the at least one word corresponding to the one or more of the plurality of proxy UI elements.

In some embodiments, the transcript of the audio sample may be received from a speech recognition computing platform. The speech recognition computing platform may be a computing platform distinct from the remote computing platform and the computing platform hosting the hosted application.

In some embodiments, a portion of the plurality of proxy UI elements may be configured to be visible to the user of the remote computing platform. In some embodiments, the portion of the plurality of proxy UI elements configured to be visible to the user of the remote computing platform may include one or more visual cues. The visual cue(s) may be configured to be overlaid on one or more of the UI elements generated by the hosted application. In such embodiments, the at least one word corresponding to one or more of the proxy UI elements may include at least one word corresponding to the visual cue(s). In some embodiments, the portion of the plurality of proxy UI elements configured to be visible to the user of the remote computing platform may include a cursor targeting reticle configured to be overlaid on one or more of the plurality of UI elements of the UI generated by the hosted application. In such embodiments, the at least one word corresponding to one or more of the proxy UI elements may include at least one word for directing movement of the cursor targeting reticle.

In some embodiments, a portion of the plurality of proxy UI elements may be configured to be hidden from view of the user of the remote computing platform. In some embodiments, the portion of proxy UI elements that are configured to be hidden from view of the remote computing platform may include one or more cursor direction options. In such embodiments, the at least one word corresponding to one or more of the proxy UI elements may include at least one word corresponding to one or more of the cursor direction options. In some embodiments, the portion of proxy UI elements that are configured to be hidden from view of the remote computing platform may include one or more macro options configured to invoke a series of commands associated with the hosted application. In such embodiments, the at least one word corresponding to one or more of the proxy UI elements may include at least one word associated with the one or more macro options, and invoking the functionality of the hosted application may include invoking the series of commands.

In some embodiments, the portion of proxy UI elements that are configured to be hidden from view of the remote computing platform may include one or more keyboard shortcut options configured to invoke a series of commands associated with the hosted application. In such embodiments, the at least one word corresponding to one or more of the proxy UI elements may include at least one word associated with the one or more keyboard shortcut options, and invoking the functionality of the hosted application may include invoking the series of commands. In some embodiments, the portion of proxy UI elements that are configured to be hidden from view of the remote computing platform may include a navigation menu option. The navigation menu option may include one or more navigation options available from a UI state of the hosted application currently being displayed by the remote computing platform. In such embodiments, the at least one word corresponding to one or more of the proxy UI elements may include at least one word corresponding to the navigation menu option, and invoking the functionality of the hosted application may include navigating the hosted application to one of the one or more navigation options.

In some embodiments, properties of the UI elements may be identified. The proxy UI elements may be generated based on the identified properties of the UI elements. Each respective proxy UI element may be associated with one or more words corresponding to one or more of the properties, the one or more of the properties corresponding to one or more of the UI elements that correspond to the respective proxy UI element. In some embodiments, the properties may include one or more indications of positional-relationship of one or more of the UI elements in relation to one or more other of the UI elements. In such embodiments, the at least one word corresponding to one or more of the proxy UI elements may include a word indicating the positional-relationship of the one or more of the UI elements in relation to one or more other of the UI elements, and invoking the functionality of the hosted application may include changing a currently selected UI element of the hosted application from one or more of the UI elements to the one or more other of the UI elements.

In some embodiments, the identified properties may include one or more drop-down selection options of a drop-down UI element. In such embodiments, the at least one word corresponding to one or more of the proxy UI elements may include a word corresponding to at least one of the one or more drop-down selection options of the drop-down UI element, and invoking the functionality of the hosted application may include selecting the at least one of the one or more drop-down selection options of the drop-down UI element. In some embodiments, the identified properties may include one or more UI element labels of a labeled UI element. In such embodiments, the at least one word corresponding to one or more of the proxy UI elements may include a word corresponding to at least one of the one or more UI element labels of the labeled UI element, and invoking the functionality of the hosted application may include changing a currently selected UI element of the hosted application from the currently selected UI element of the hosted application to the labeled UI element.

In some embodiments, the hosted application may run within a virtualized computing environment of a virtualization platform. The remote computing platform may access the virtualized computing environment via a receiver application executed on the remote computing platform. In some embodiments, the hosted application and/or the receiver application may include a web browser or web browser plugin. Identifying the plurality of UI elements may include at least one call to a browser helper object (BHO) of the at least one of the web browser or the web browser plugin.

In some embodiments, one or more changes in the plurality of UI elements may be detected. Responsive to detecting the one or more changes in the plurality of UI elements, additional proxy UI elements may be generated. Each of the additional proxy UI elements may correspond to at least one of the one or more detected changes in the plurality of UI elements.

BRIEF DESCRIPTION OF THE DRAWINGS

Figure 1:
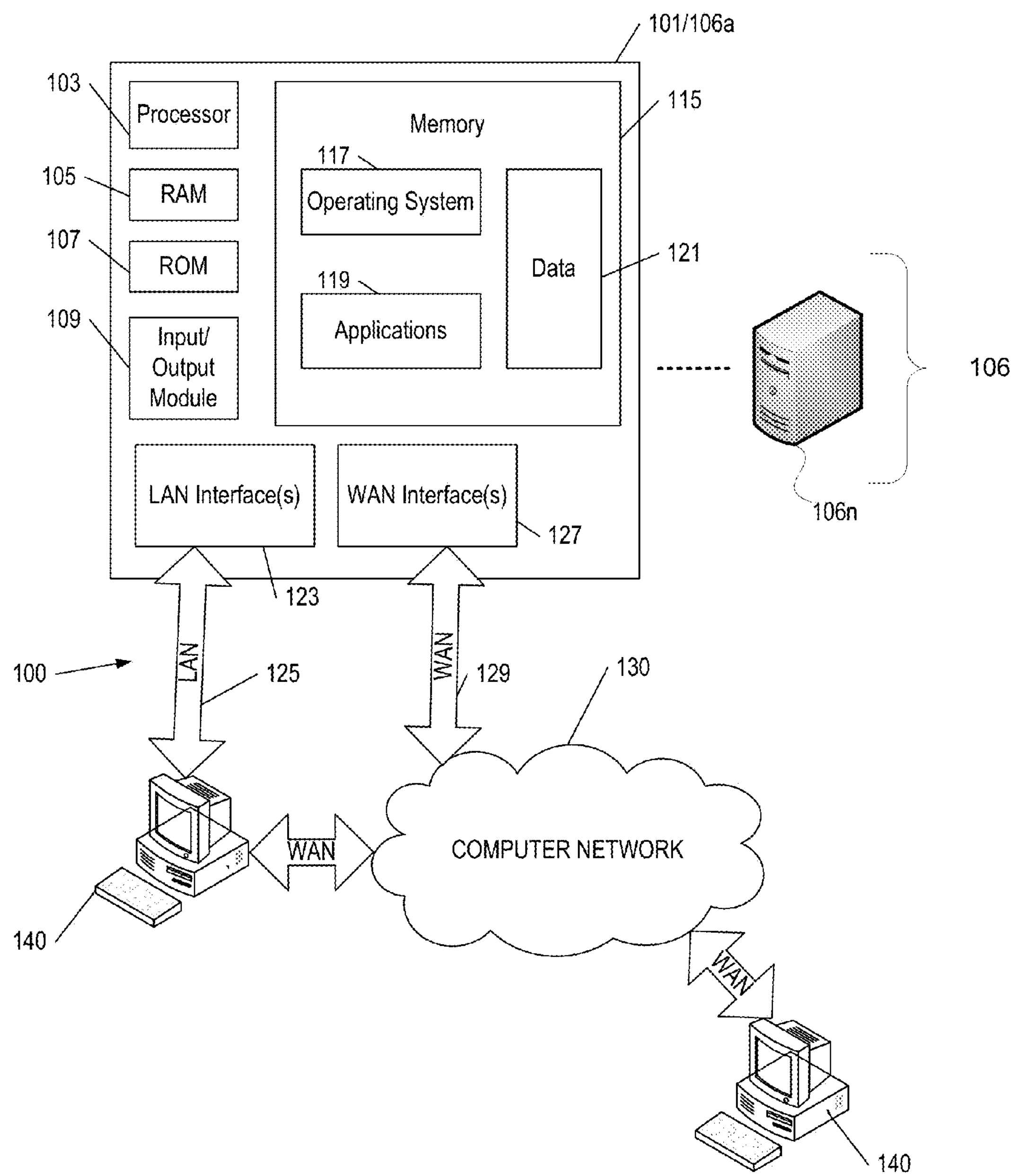
Figure 2:
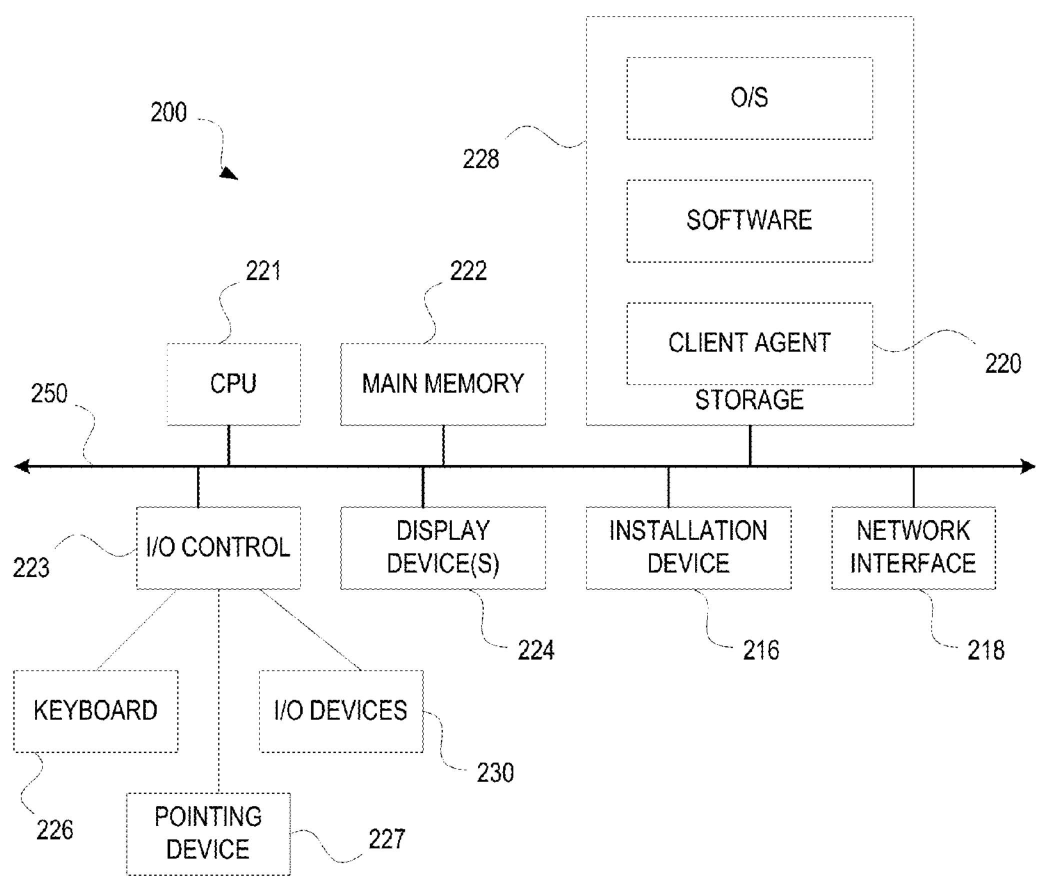
Figure 3:
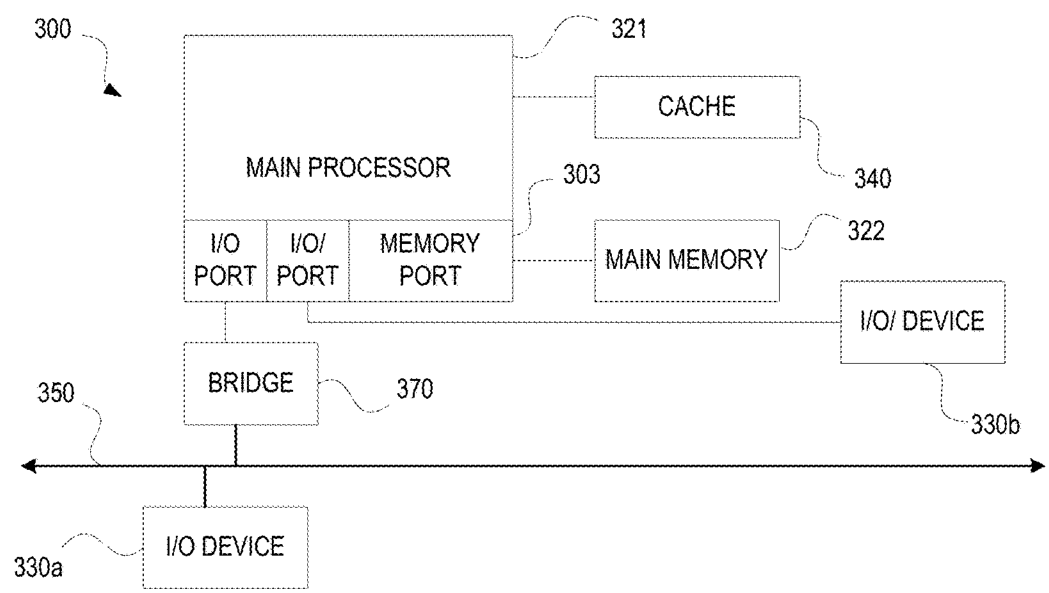
Figure 4:
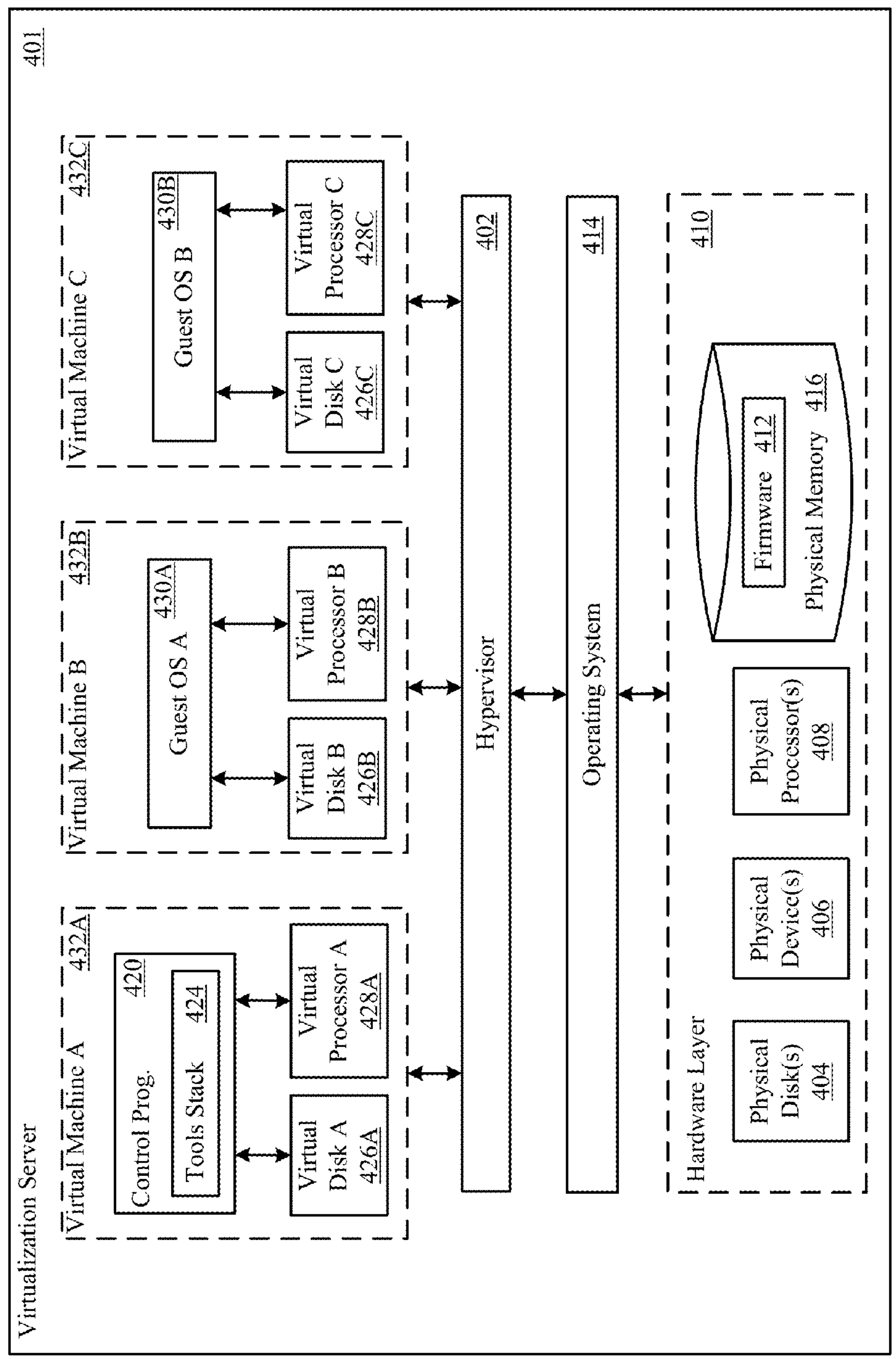
Figure 5:
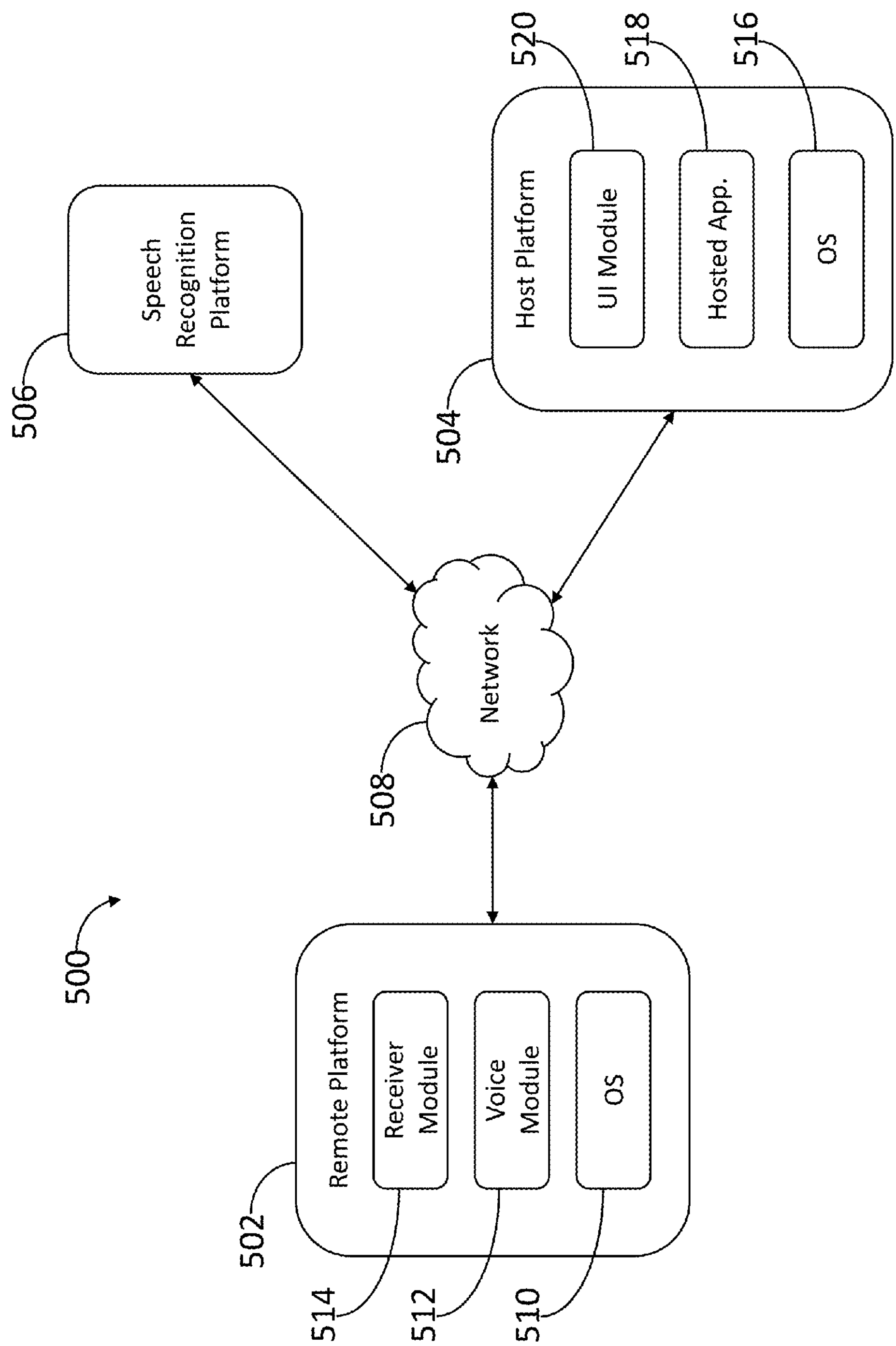
Figure 6A:
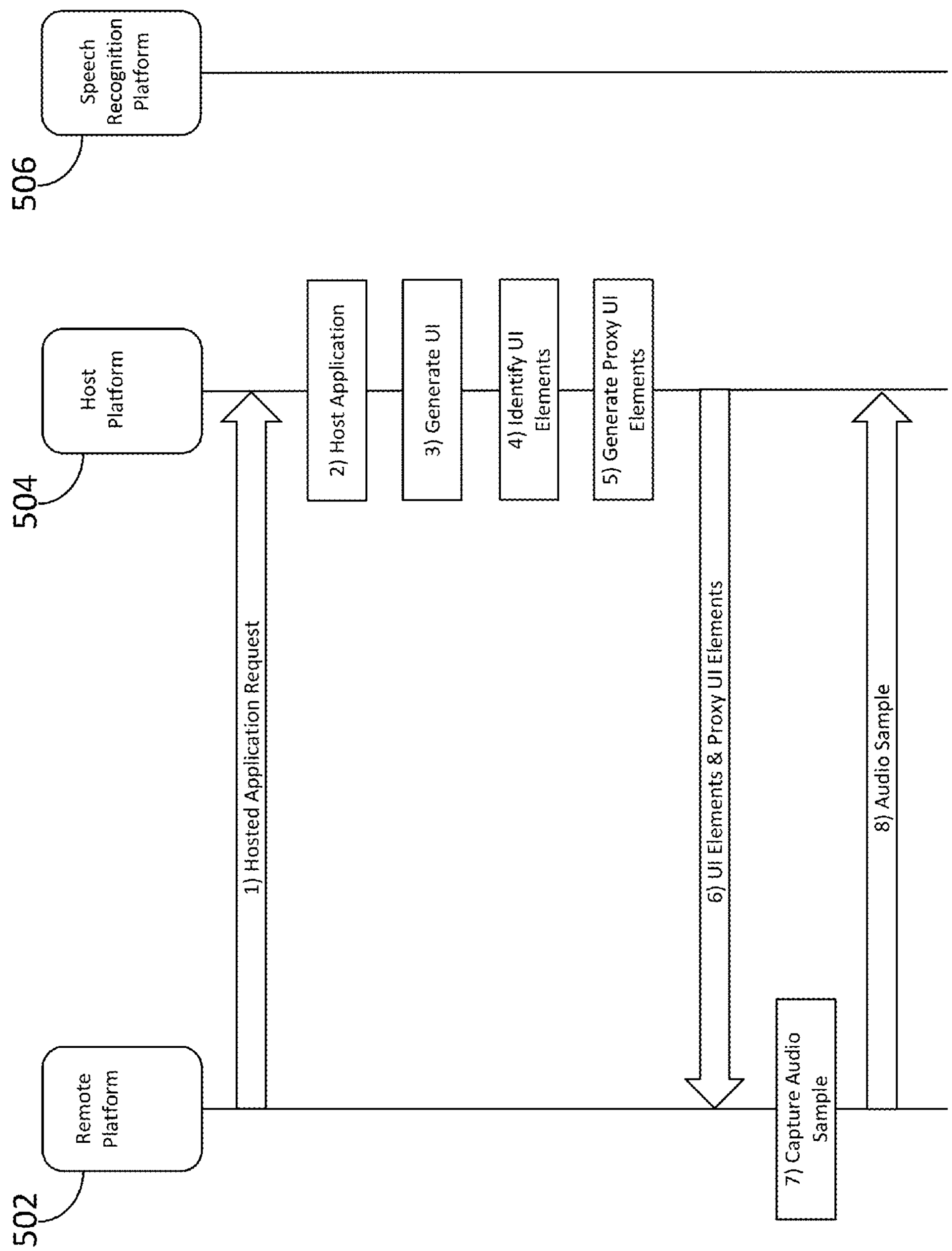
Figure 6B:
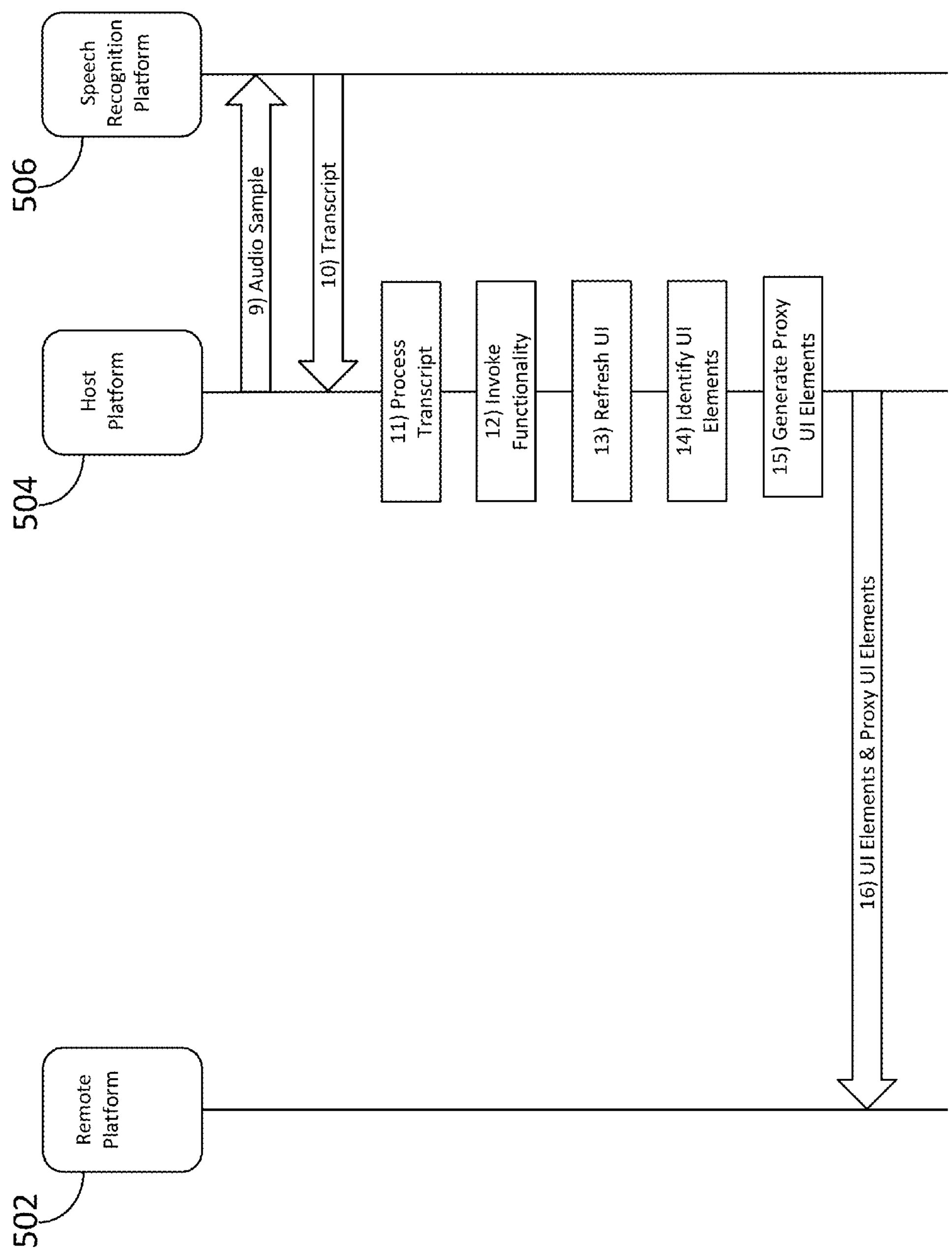
Figure 8B:
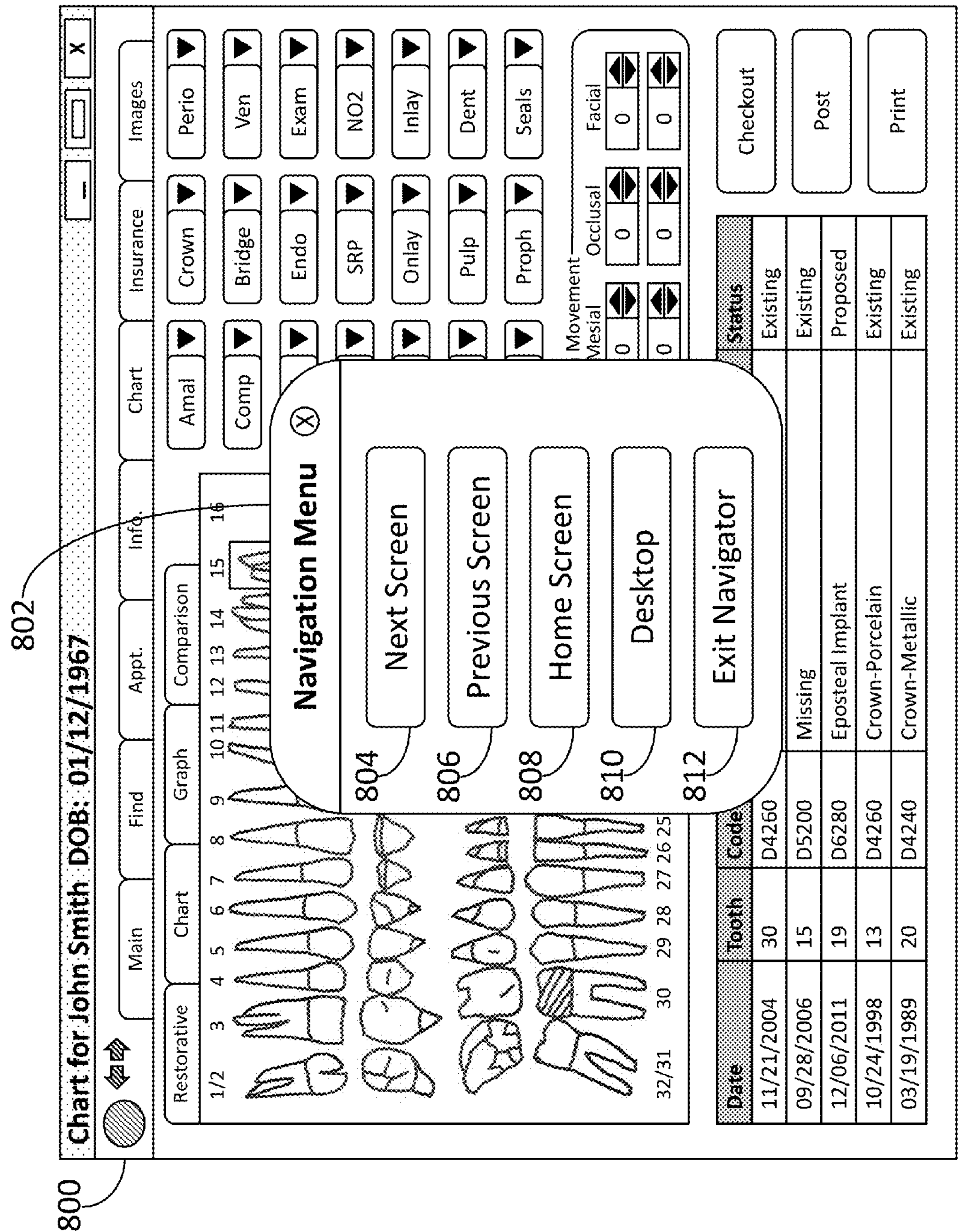
Figure 10:
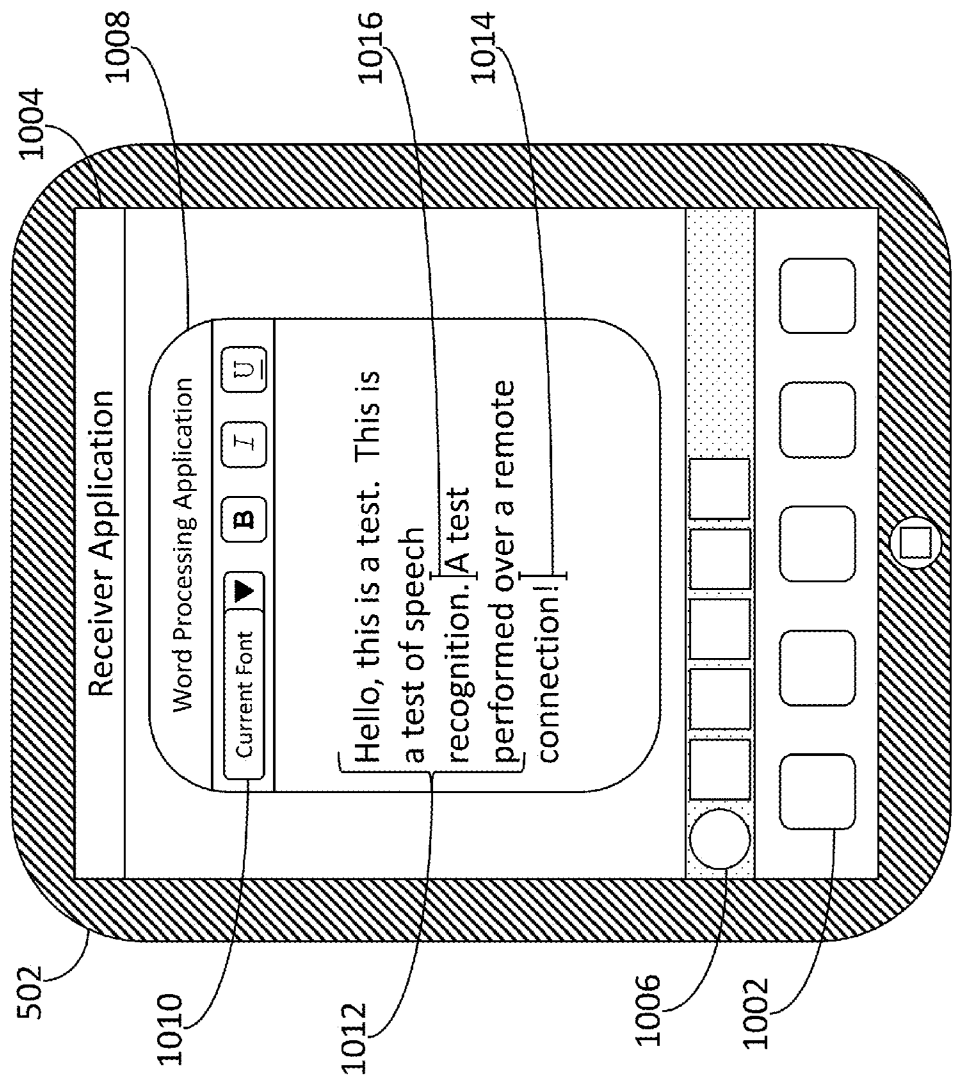
Figure 11:
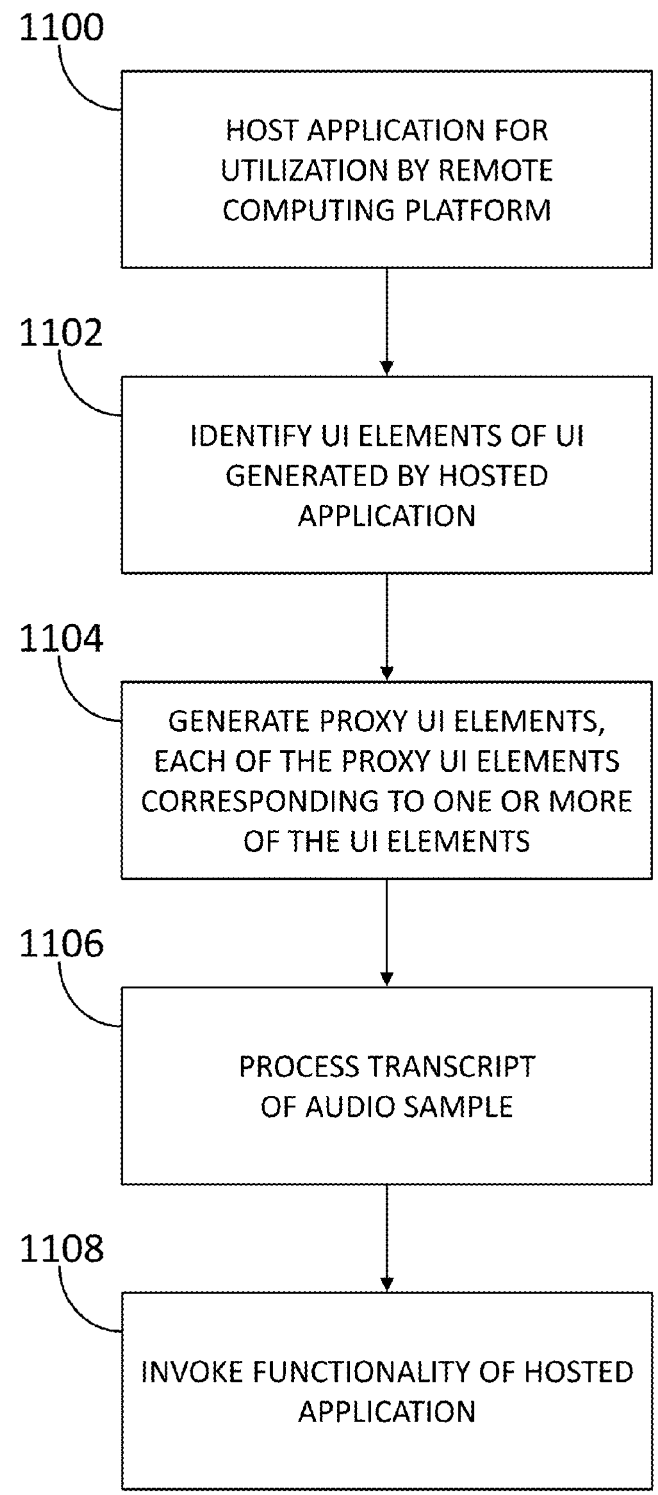

Having thus described aspects of the disclosure in general terms, reference will now be made to the accompanying drawings, which are not necessarily drawn to scale, and wherein:

FIG. 1 depicts an example operating environment in which various aspects of the disclosure may be implemented;

FIG. 2 depicts an example computing device that may be used in accordance with one or more illustrative aspects described herein;

FIG. 3 depicts an example computing device that may be used in accordance with one or more illustrative aspects described herein;

FIG. 4 depicts an example of a virtualization server that may be used in accordance with one or more illustrative aspects described herein;

FIG. 5 depicts an example computing environment for speech recognition support for remote applications and desktops in accordance with one or more illustrative aspects described herein;

FIGS. 6A and 6B depict an example event flow for speech recognition support for remote applications and desktops in accordance with one or more illustrative aspects described herein;

FIG. 7 depicts an example user interface of a hosted application that may be interacted with using speech recognition support for remote applications and desktops in accordance with one or more illustrative aspects described herein;

FIGS. 8A and 8B depict additional example user interfaces of a hosted application that may be interacted with using speech recognition support for remote applications and desktops in accordance with one or more illustrative aspects described herein;

FIGS. 9A, 9B, 9C, 9D, 9E, and 9F depict an additional example event flow for speech recognition support for remote applications and desktops in accordance with one or more illustrative aspects described herein;

FIG. 10 depicts an example user view that includes illustrative user interfaces of a hosted application that may be interacted with using speech recognition support for remote applications and desktops in accordance with one or more illustrative aspects described herein; and FIG. 11 depicts an example method for speech recognition support for remote applications and desktops in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106*a*) in an example computing environment 100 that may be used according to one or more illustrative embodiments of the disclosure. According to one or more aspects, generic computing device 101 may be a server 106*a* in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106*a*-106*n* (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine (s) 140; client(s); client computer(s); client device(s); client computing device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a virtual machine receiver program or application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106A that receives requests from a client machine 140, forwards the request to a second server 106*n*, and responds to the request generated by the client machine 140 with a response from the second server 106*n*. The first server 106A can acquire an enumeration of applications available to the client machine 140 as well as address information associated with an application server 106 hosting an application identified within the enumeration of applications. The first server 106A can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330*a*. In another embodiment, the bridge 370 is in further communication with the main central processing unit 321, where the central processing unit 321 can further communicate with a second I/O device 330*b*, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 includes one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330*a*-330*n*. In some embodiments, the local system bus 350 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 300 include an I/O device 330*a*-330*n* that includes a video display 224 that communicates with the central processing unit 321. Still other versions of the computing machine 300 include a processor 321 connected to an I/O device 330*a*-330*n* via any one of the following connections: HyperTransport, Rapid I/O, or InfiniBand. Further embodiments of the computing machine 300 include a processor 321 that communicates with one I/O device 330*a* using a local interconnect bus and a second I/O device 330*b* using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCMCIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230*a*-230*n*: a keyboard 226; a pointing device 227; mice; trackpads; an optical pen; one or more trackballs; one or more microphones; one or more drawing tablets; one or more video displays; one or more speakers; one or more inkjet printers; one or more laser printers; and one or more dye-sublimation printers; or any other input/output device able to receive user input and/or provide user output. An I/O controller 223 may in some embodiments connect to multiple I/O devices 230*a*-230*n* to control the one or more I/O devices. Some embodiments of the I/O devices 230*a*-230*n* may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224*a*-224*n*, in other embodiments the computing device 200, 300 can connect to a single display device 224, while in still other embodiments the computing device 200, 300 connects to display devices 224*a*-224*n* that are the same type or form of display, or to display devices that are different types or forms. Embodiments of the display devices 224*a*-224*n* can be supported and enabled by the following: one or multiple I/O devices 230*a*-230*n*; the I/O controller 223; a combination of I/O device(s) 230*a*-230*n* and the I/O controller 223; any combination of hardware and software able to support a display device 224*a*-224*n*; any type and/or form of video adapter, video card, driver, and/or library to interface, communicate, connect or otherwise use the display devices 224*a*-224*n*. The computing device 200, 300 may in some embodiments be configured to use one or multiple display devices 224*a*-224*n*, these configurations include: having multiple connectors to interface to multiple display devices 224*a*-224*n*; having multiple video adapters, with each video adapter connected to one or more of the display devices 224*a*-224*n*; having an operating system configured to support multiple displays 224*a*-224*n*; using circuits and software included within the computing device 200 to connect to and use multiple display devices 224*a*-224*n*; and executing software on the main computing device 200 and multiple secondary computing devices to enable the main computing device 200 to use a secondary computing device's display as a display device 224*a*-224*n* for the main computing device 200. Still other embodiments of the computing device 200 may include multiple display devices 224*a*-224*n* provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiments, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 200 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif. While FIGS. 1-3 may be described with respect to specific examples of hardware and/or software that may be used, such examples are in no way limiting, but instead are merely illustrative of the type of resources that may be utilized as technology progresses.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Illustrated in FIG. 4 is one embodiment of a computer device 401 configured as a virtualization server in a virtualization environment, for example, a single-server, multi-server, or cloud computing environment. The virtualization server 401 illustrated in FIG. 4 can be deployed as and/or implemented by one or more embodiments of the server 106 illustrated in FIG. 1 or by other known computing devices. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C may be executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above with respect to FIG. 1. For instance, physical disks 404 may include permanent memory storage, temporary memory storage, disk drives (e.g., optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be a Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors 408 of the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may execute a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may present at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments, the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

FIG. 5 depicts an example computing environment for speech recognition support for remote applications and desktops in accordance with one or more illustrative aspects described herein. Referring to FIG. 5, computing environment 500 may include one or more computing platforms. For example, computing environment 500 may include remote computing platform 502, host computing platform 504, and/or speech recognition computing platform 506. Remote computing platform 502, host computing platform 504, and/or speech recognition computing platform 506 may include one or more computing devices configured to perform one or more functions described herein (e.g., desktop computers, laptop computers, tablet computers, smartphones, or mobile devices). Remote computing platform 502, host computing platform 504, and/or speech recognition computing platform 506 may include one or more components (e.g., processor, memories, displays, communication interfaces, etc.), such as those described above with respect to FIGS. 1-4. Computing environment 500 may also include one or more networks. For example, computing environment 500 may include network 508, which may comprise one or more LANs and/or WANs, which may interconnect remote computing platform 502, host computing platform 504, and/or speech recognition computing platform 506.

Remote computing platform 502 may include one or more memories, which may include one or more applications and/or modules. For example, remote computing platform 502 may include operating system (OS) 510, voice module 512, and/or receiver module 514. OS 510 may be remote computing platform 502's native OS and may support one or more basic operations for remote computing platform 502 (e.g., software/hardware interaction). Voice module 512 may support audio input and/or output for remote computing platform 502, and may be a component of OS 510, a distinct module, and/or a combination of the two. Receiver module 514 may be a "client side" application that supports access to one or more remote applications and/or desktops (e.g., a remote desktop application, such as a CITRIX client, described above). In some embodiments, receiver module 514 may be a web browser or a web browser component (e.g., plugin).

Host computing platform 504 may include one or more memories, which may include one or more applications and/or modules. For example, host computing platform 504 may include OS 516, hosted application module 518, and/or UI module 520. OS 516 may be host computing platform 504's native OS and may support one or more basic operations for host computing platform 504 (e.g., software/hardware interaction). Hosted application module 518 may be an end-user application configured to execute on host computing platform 518 and be accessible to a user of a distinct computing platform (e.g., a user of remote computing platform 502). In some embodiments, host computing platform 504 may be a virtualization platform, such as that described above with respect to FIG. 4. For example, host computing platform 504 may instantiate and/or support a virtualized computing environment, which may be accessible to a user of a distinct computing platform (e.g., a user of remote computing platform 502 via receiver module 514). In such embodiments, one or more end-user applications of hosted application module 518 may be accessible via such a virtualized computing environment. In some embodiments, such a virtualized computing environment may be specific to one or more end-user applications. In other embodiments, the virtualized computing environment may be akin to a general purpose computing environment (e.g., a remote or simulated desktop), and one or more end-user applications may be accessible to the remote user via the virtualized computing environment.

Speech recognition computing platform 506 may be a computing platform distinct from remote computing platform 502 and host computing platform 506, and may support one or more speech recognition services. For example, speech recognition computing platform 506 may be configured to receive an audio sample that includes one or more user's voice(s) (e.g., from remote computing platform 502 or host computing platform 504) and utilize speech recognition technology to produce a transcript or computer parseable record of the word(s) spoken by the user(s). Speech recognition platform 506 may also be configured to communicate such a transcript or computer parseable record to one or more other computing platforms within computing environment 500 (e.g., remote computing platform 502 or host computing platform 504).

As indicated above, host computing platform 504 may include UI module 520. UI module 520 may be configured to identify one or more UI elements of a generated UI (e.g., a UI generated by hosted application module 518). UI module 520 may further be configured to generate one or more proxy UI elements. Each of these proxy UI elements may correspond to one or more of the identified UI elements. Host computing platform 504 may communicate these UI elements and proxy UI elements to remote computing platform 502 (e.g., via network 508) where they may be accessible to a user of remote computing platform 502 (e.g., via receiver module 514). As will be described in greater detail below, one or more proxy UI elements may be utilized to support speech recognition for remote applications and desktops in accordance with one or more aspects described herein.

The allocation of certain functions to certain modules and the allocation of certain modules to certain computing platforms are merely for simplicity of illustration. Any of the functionality or modules described herein may be separated or combined, and/or allocated to one or more various computing platforms, as desired. For example, the functionality of speech recognition platform 506 may be performed by remote computing platform 502 and/or host computing platform 504. Similarly, one or more aspects of UI module 520's functionality described herein may be combined with one or more other modules or performed by one or more separate modules, which may be executed on any combination of computing platforms (e.g., remote computing platform 502, host computing platform 504, or a combination thereof).

FIGS. 6A and 6B depict an example event flow for speech recognition support for remote applications and desktops in accordance with one or more illustrative aspects described herein. Referring to FIG. 6A, at step 1, remote computing platform 502 may communicate a hosted application request to host computing platform 504. For example, remote computing platform 502 may be utilizing a virtualized computing environment (e.g., a virtual desktop) supported by host computing platform 504, and may communicate a request to utilize an end-user application supported by hosted application module 518. At step 2, host computing platform 504 may host the hosted application requested by remote computing platform 502. For example, host computing platform 504 may initialize the end-user application supported by hosted application module 518, and may host the end-user application for utilization by remote computing platform 502 (e.g., via receiver module 514). At step 3, host computing platform 504 may generate a UI. For example, host computing platform 504 may generate a UI associated with the end-user application supported by hosted application module 518. For example, host computing platform 504 may generate a UI such as UI 700, depicted in FIG. 7. Referring to FIG. 7, UI 700 may include one or more UI elements. For example, UI 700 may include UI elements 702, 704, 706, 708, and 710. Referring to FIG. 6A, at step 4, host computing platform 504 may identify one or more UI elements of the generated UI. For example, UI module 520 may identify UI elements 702, 704, 706, 708, and 710. At step 5, host computing platform 504 may generate one or more proxy UI elements. Each of the proxy UI elements may correspond to one or more of the identified UI elements. For example, UI module 520 may generate one or more proxy UI elements corresponding to each of UI elements 702, 704, 706, 708, and 710.

In some embodiments, a portion of the proxy UI elements may be configured to be visible to a user of remote computing platform 502. For example, proxy UI elements 712, 714, 716, and 718 may be visible to a user of remote computing platform 502. In some embodiments, one or more of the visible proxy UI elements may include one or more visual cues configured to be overlaid on one or more corresponding UI elements. For example, proxy UI element 712 may correspond to UI element 704, may include a visual cue depicting the number "1," and may be configured to be overlaid on UI element 704. Similarly, proxy UI element 714 may correspond to UI element 706, may include a visual cue depicting the number "2," and may be configured to be overlaid on UI element 706; and proxy UI element 716 may correspond to UI element 708, may include a visual cue depicting the number "3," and may be configured to be overlaid on UI element 708. In some embodiments, one or more of the visible proxy UI elements may include a cursor targeting reticle, which may be configured to be overlaid on one or more UI elements. For example, proxy UI element 718 may be a cursor targeting reticle, and may be configured to be overlaid on UI element 704.

In some embodiments, a portion of the proxy UI elements may be configured to be hidden from view of a user of remote computing platform 502. For example, one or more hidden proxy UI elements (not illustrated) may be generated that correspond to one or more cursor directions (e.g., up, down, left, right). In some embodiments, a portion of the hidden proxy UI elements may include one or more proxy UI elements corresponding to one or more macro options (e.g., find occurrences of a particular text string and bold each found occurrence of the text string, etc.); one or more keyboard shortcut options (e.g., "Alt-A" may correspond to the "Add" function of UI element 710, "Alt-E" may correspond to the "Edit" function of UI element 710, "Alt-D" may correspond to the "Delete" function of UI element 710, "Alt-I" may correspond to the "Images" function of UI element 710, "Alt-C" may correspond to the "Close" function of UI element 710, "Ctrl-X" may correspond to a "cut" function, "Ctrl-C" may correspond to a "copy" function, "Ctrl-V" may correspond to a "paste" function, etc.); and/or, as will be described in greater detail below, one or more navigation menu options.

In some embodiments, UI module 520 may be configured to identify one or more properties of UI 700's UI elements, and the proxy UI elements may be generated based on the identified properties. For example, UI module 520 may identify one or more properties of UI elements 702, 704, 706, 708, and 710, and one or more proxy UI elements may be generated based on the identified properties. The generated proxy UI elements may include one or more words associated with the identified properties of the UI elements to which they correspond. In some embodiments, the properties may be identified using one or more application program interfaces (APIs) (e.g., MICROSOFT WINDOWS's UI Automation API or Active Accessibility API).

In some embodiments, a web browser or web browser plugin's browser helper object (BHO) may be utilized in identifying one or more of the properties of the UI elements (e.g., selecting one or more links or search results in web content or a web application).

In some embodiments, the identified properties of the UI elements may include one or more positional-relationships between one or more of the UI elements and one or more other UI elements. For example, UI module 520 may identify that UI element 702 is located above UI element 704. Similarly, UI module 520 may identify that UI element 704 is located below UI element 702 and above UI element 706, that UI element 706 is located below UI element 704 and above UI element 708, that UI element 708 is located below UI element 706 and above UI element 710, and that UI element 710 is located below UI element 708. Corresponding positional-relationship words may be associated with each of the proxy UI elements corresponding to UI elements 702, 704, 706, 708, and 710 (e.g., above, below, right, left, etc.). These words may be used in conjunction with one or more other words (e.g., one or more words associated with one or more other proxy UI elements) to navigate within UI 700.

In some embodiments, the identified properties of the UI elements may include one or more drop-down selection options. For example, UI element 702 may be a drop-down menu that includes one or more drop-down options for selection by a user. UI module 520 may determine that UI element 702 is a drop-down menu and may identify one or more options for selection from UI element 702 (e.g., "Routine Hygiene," "Minor Procedure," "Major Procedure," etc.). One or more proxy UI elements may be generated that include words associated with each of the identified drop-down options (e.g., "Routine Hygiene," "Minor Procedure," "Major Procedure," etc.).

In some embodiments, the identified properties may include one or more UI element labels of a labeled UI element. For example, UI element 704 may be labeled "Treatment, Notes." UI module 520 may determine that UI element 704 is a labeled UI element and may generate one or more proxy UI elements corresponding to UI element 704. These proxy UI element(s) may be associated with one or more words corresponding to the identified labels (e.g., "Treatment, Notes"). Similarly, UI element 706 may be labeled "Remarks, Hygienist," and UI module 520 may determine that UI element 706 is a labeled UI element and may generate one or more proxy UI elements corresponding to UI element 706, which may be associated with words corresponding to the identified labels (e.g., "Remarks, Hygienist"); UI element 708 may be labeled "Remarks, DDS," and UI module 520 may determine that UI element 708 is a labeled UI element and may generate one or more proxy UI elements corresponding to UI element 708, which may be associated with words corresponding to the identified labels (e.g., "Remarks, DDS"); and UI element 710 may be labeled "Action," and UI module 520 may determine that UI element 710 is a labeled UI element and may generate one or more proxy UI elements corresponding to UI element 710, which may be associated with words corresponding to the identified labels (e.g., "Action").

At step 6, the generated UI (including the identified UI elements) and the proxy UI elements may be communicated to remote computing platform 502. For example, UI 700 (including UI elements 702, 704, 706, 708, and 710), and proxy UI elements 712, 714, 716, and 718 may be communicated to remote computing platform 502. At step 7, remote computing platform 502 may capture one or more audio samples. For example, a user of remote computing platform 502 may invoke speech recognition (e.g., using a keyword, via an input device, etc.). The audio sample(s) may include an utterance of the user of remote computing platform 502. At step 8, the audio sample(s) may be communicated to host computing platform 504, which may, referring to FIG. 6B, at step 9, forward the audio sample(s) to speech recognition platform 506. Speech recognition platform 506 may utilize speech recognition technology to convert the audio samples into one or more transcripts or computer parseable records, and, at step 10, may communicate such transcript(s) or computer parseable record(s) to host computing platform 504. For example, speech recognition platform 506 may communicate a transcript of one or more utterances of a user of remote computing platform 502 to host computing platform 504.

At step 11, host computing platform 504 may process the transcript(s) or computer parseable record(s) received from speech recognition platform 506. For example, host computing platform 504 may process the transcript of the utterance(s) of the user of remote computing platform 502. Processing the transcript of the utterance(s) of the user of remote computing platform 502 may include parsing the transcript to identify one or more occurrences of one or more words associated with a proxy UI element. For example, the user of remote computing platform 502 may have spoken an utterance that included the word "one," and host computing platform 504 may parse the transcript received from speech recognition platform 506 and identify the word "one" within the transcript. At step 12, host computing platform 504 may invoke one or more functionalities of the end-user application supported by hosted application module 518 that correspond to a UI element of UI 700 corresponding to a proxy UI element associated with the identified word(s). For example, host computing platform 504 may select UI element 704. Similarly, the user of remote computing platform 502 may have spoken an utterance that included the word "two," host computing platform 504 may parse the transcript received from speech recognition platform 506, identify the word "two" within the transcript, and select UI element 706; or the user of remote computing platform 502 may have spoken an utterance that included the word "three," host computing platform 504 may parse the transcript received from speech recognition platform 506, identify the word "three" within the transcript, and select UI element 708.

Additionally or alternatively, the user of remote computing platform 502 may have spoken an utterance that included the words "Alt-A," host computing platform 504 may parse the transcript received from speech recognition platform 506, identify the words "Alt-A" within the transcript, and invoke the "Add" function of UI element 710. Similarly, the user of remote computing platform 502 may have spoken an utterance that included the words "Alt-E," host computing platform 504 may parse the transcript received from speech recognition platform 506, identify the words "Alt-E" within the transcript, and invoke the "Edit" function of UI element 710; the user of remote computing platform 502 may have spoken an utterance that included the words "Alt-D," host computing platform 504 may parse the transcript received from speech recognition platform 506, identify the words "Alt-D" within the transcript, and invoke the "Delete" function of UI element 710; the user of remote computing platform 502 may have spoken an utterance that included the words "Alt-I," host computing platform 504 may parse the transcript received from speech recognition platform 506, identify the words "Alt-I" within the transcript, and invoke the "Images" function of UI element 710;

or the user of remote computing platform 502 may have spoken an utterance that included the words "Alt-C," host computing platform 504 may parse the transcript received from speech recognition platform 506, identify the words "Alt-C" within the transcript, and invoke the "Close" function of UI element 710.

Additionally or alternatively, the user of remote computing platform 502 may have spoken an utterance that included the words "move cursor right," host computing platform 504 may parse the transcript received from speech recognition platform 506, identify the words "move cursor right" within the transcript, and move a cursor associated with UI 700 to the right of its current position on UI 700. Additionally or alternatively, the user of remote computing platform 502 may have spoken an utterance that included the words "move cursor targeting reticle right," host computing platform 504 may parse the transcript received from speech recognition platform 506, identify the words "move cursor targeting reticle right" within the transcript, and move proxy UI element 718 toward the right of UI 700.

In some embodiments, one or more of the identified UI elements may include a drop-down menu, and one or more of the proxy UI elements may correspond to the drop-down menu and/or one or more options listed within the drop-down menu. For example, UI element 702 may be a drop-down menu and one or more proxy UI elements (not illustrated) may correspond to UI element 702 and/or one or more options listed within the drop-down menu (e.g., "Routine Hygiene," "Minor Procedure," "Major Procedure," etc.). In such embodiments, the user of remote computing platform 502 may have spoken an utterance that included the words "select minor procedure," host computing platform 504 may parse the transcript received from speech recognition platform 506, identify the words "select minor procedure" within the transcript, determine that the words "select minor procedure" are associated with a proxy UI element corresponding to UI element 702, and change the active selection of UI element 702 from "Routine Hygiene" to "Minor Procedure."

In some embodiments, the user of remote computing platform 502 may have spoken an utterance that included the words "insert text, 'monitor right upper molars period right upper molars show signs of decay period.'" Speech recognition platform 506 may recognize the words "insert text" as invoking a dictation function, and may "polish" the text string "monitor right upper molars period right upper molars show signs of decay period" to produce "Monitor right upper molars. Right upper molars show signs of decay." Host computing platform 504 may parse the transcript received from speech recognition platform 506, identify the polished text string and insert the polished text string into one or more UI elements of UI 700 (e.g., UI element 708).

In some embodiments, the user of remote computing platform 502 may have spoken an utterance that included the words "bold each occurrence of right upper molars." Host computing platform 504 may recognize the words "bold each occurrence" as invoking one or more macro functions, and may execute one or more commands associated with the macro function(s). For example, host computing platform 504 may invoke one or more commands to identify and select each occurrence of "right upper molars," and may then invoke a function to bold the selected text.

As indicated above, in some embodiments, the user of remote computing platform 502 may have spoken an utterance that included one or more words associated with a navigation menu and/or one or more navigation menu options. For example, the user of remote computing platform 502 may have spoken an utterance that included the words "navigation menu" or "what are my navigation options." For example, referring to FIG. 8A, UI 800 may have been displayed to a user of remote computing platform 502 (e.g., via receiver module 514), and the user may have spoken the words "navigation menu." The words "navigation menu" may be associated with a hidden proxy UI element. Host computing platform 504 may recognize the words "navigation menu" and may invoke a function to display, referring to FIG. 8B, navigation menu 802. Navigation menu 802 may comprise one or more UI elements associated with possible navigation options. For example, navigation menu 802 may include UI elements 804, 806, 808, 810, and 812, respectively associated with navigation options "next screen," "previous screen," "home screen," "desktop," and "exit navigator."

At step 13, host computing platform 504 may determine that one or more changes have occurred within the UI. For example, in the context of the "navigation menu" example, host computing platform 504 may determine that UI 800 now includes navigation menu 802. At step 14, UI module 520 may refresh the UI, and identify one or more UI elements that have changed. For example, UI module 520 may identify navigation menu 802, and UI elements 804, 806, 808, 810, and 812. At step 15, UI module 520 may generate one or more proxy UI elements corresponding to one or more of the identified UI elements that have changed. As described above, the generated proxy UI elements may be based on one or more identified properties of the UI elements. For example, UI module 520 may identify that UI elements 804, 806, 808, 810, and 812 are respectively labeled "next screen," "previous screen," "home screen," "desktop," and "exit navigator," and UI module 520 may generate one or more proxy UI elements corresponding to UI elements 804, 806, 808, 810, and 812 that include word(s) associated with their respective labels (e.g., "next screen," "previous screen," "home screen," "desktop," and "exit navigator"). At step 16, the identified changed UI elements and their corresponding proxy UI elements may be communicated to remote computing platform 502, which may display the UI elements and/or any of the proxy UI elements configured to be visible.

Figure 9A:
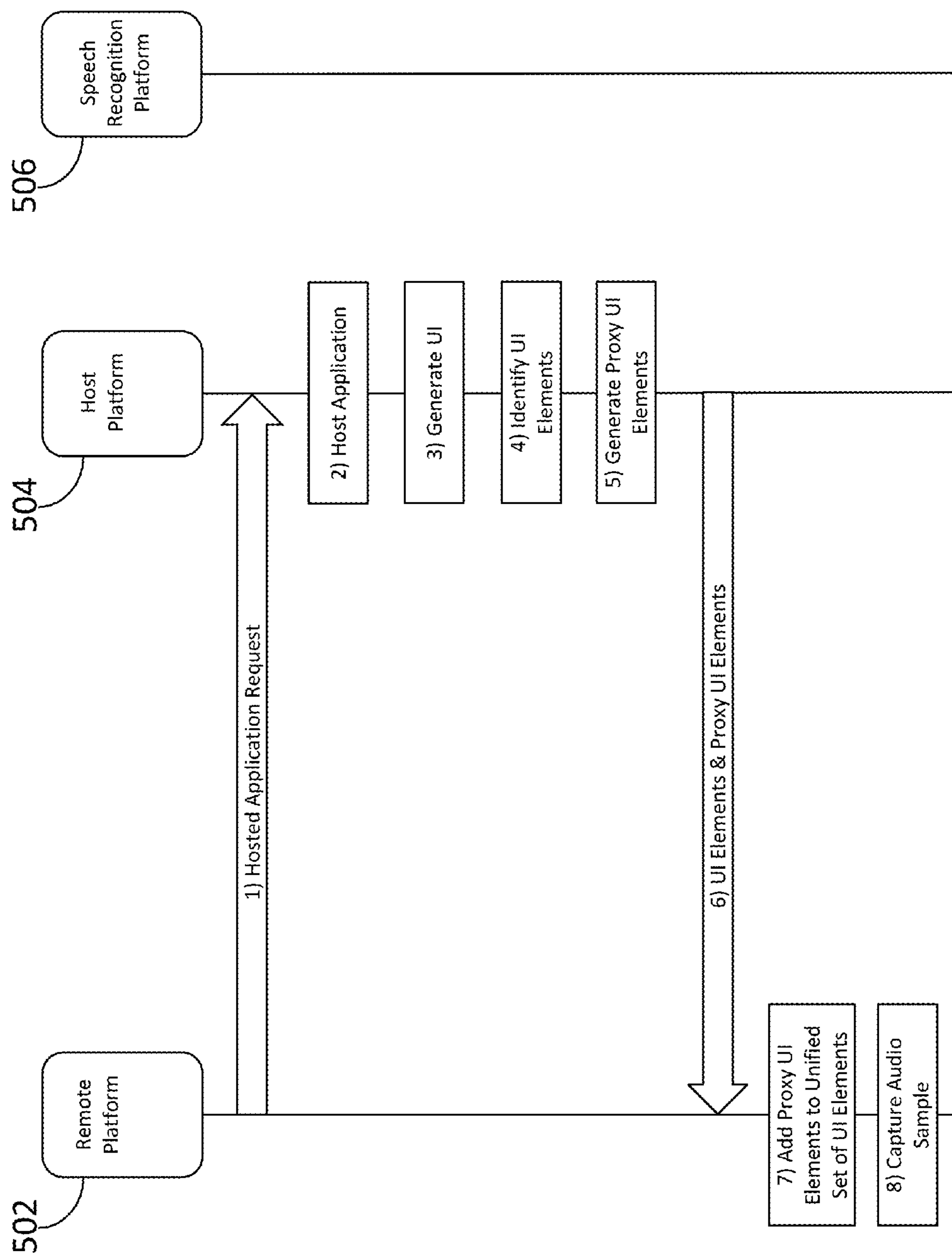

FIGS. 9A, 9B, 9C, 9D, 9E, and 9F depict an additional example event flow for speech recognition support for remote applications and desktops in accordance with one or more illustrative aspects described herein; and FIG. 10 depicts an example user view that includes illustrative user interfaces of a hosted application that may be interacted with using speech recognition support for remote applications and desktops in accordance with one or more illustrative aspects described herein. Referring to FIG. 9A, at step 1, remote computing platform 502 may communicate a hosted application request to host computing platform 504. For example, referring to FIG. 10, remote computing platform 502 may include a computing device (e.g., a desktop computer, laptop computer, smart television, iPAD, ANDROID device, WINDOWS phone, or other computing device). Remote computing platform 502 may display one or more local UI elements. For example, remote computing platform 502 may display local UI element 1002 (e.g., a UI element associated with remote computing platform 502's OS or one or more applications executed locally on remote computing platform 502).

As indicated above, remote computing platform 502 may include receiver module 514. Receiver module 514 may, when executed, provide a receiver application window for viewing a hosted computing environment (e.g., a remote desktop and/or a virtualized desktop). For example, receiver module 514 may create receiver application window 1004. Receiver application window 1004 may provide a view of the hosted computing environment, which may include one or more hosted computing environment UI elements. For example, receiver application window 1004 may provide a view of a hosted computing environment supported by host computing platform 504, and such view may include hosted computing environment UI element 1006 (e.g., a UI element associated with the hosted computing environment's OS). As indicated above, referring to FIG. 9A, at step 1, remote computing platform 502 may communicate a hosted application request to host computing platform 504. For example, host computing platform 502 may communicate a request to initialize an end-user application supported by hosted application module 518 (e.g., an end-user application associated with hosted application UI 1008 (described in greater detail below)). In some embodiments, one or more messages (not illustrated) pertaining to capabilities (e.g., language, specialized field or topic, text auto-complete parameters, text auto-correct parameters, custom dictionaries, etc.) may be exchanged between remote computing platform 502 and host computing platform 504.

At step 2, host computing platform 504 may host the hosted application requested by remote computing platform 502. For example, host computing platform 504 may initialize the end-user application supported by hosted application module 518, and may host the end-user application for utilization by remote computing platform 502 (e.g., via receiver module 514). At step 3, host computing platform 504 may generate a UI. For example, host computing platform 504 may generate a UI associated with the end-user application supported by hosted application module 518. For example, host computing platform 504 may generate a UI such as hosted application UI 1008, depicted in FIG. 10. Referring to FIG. 10, hosted application UI 1008 may include one or more UI elements. For example, hosted application UI 1008 may include UI element 1010 (e.g., a drop-down menu for selecting a font).

Referring to FIG. 9A, at step 4, host computing platform 504 may identify one or more UI elements of the generated UI. For example, UI module 520 may identify UI element 1010. At step 5, host computing platform 504 may generate one or more proxy UI elements. Each of the proxy UI elements may correspond to one or more of the identified UI elements. For example, UI module 520 may generate one or more proxy UI elements corresponding to UI element 1010. Each of the generated proxy UI elements may comprise one or more words associated with functionality corresponding to the identified UI element(s) with which it corresponds. For example, the proxy UI element(s) corresponding to UI element 1010 may comprise one or more words (e.g., "current," "font," "change," etc.) associated with functionality corresponding to UI element 1010. At step 6, the generated UI (including the identified UI element(s)) and the proxy UI element(s) may be communicated to remote computing platform 502. For example, hosted application UI 1008 (including UI element 1010), and the proxy UI element (s) corresponding to UI element 1010 (not illustrated) may be communicated to remote computing platform 502.

At step 7, remote computing platform 502 may add the one or more words included in the proxy UI element(s) received from host computing platform 504 to a "unified" or "common" set of speech recognition words. For example, remote computing platform 502 may include one or more words associated with local functionality of remote computing platform 502 or one or more applications executed locally on remote computing platform 502 (e.g., "find," "go to home screen," "show contacts," "change channels," "place a new call," functionality associated with local UI element 1002, or functionality associated with receiver application window 1004, created by receiver module 514, etc.), and remote computing platform 502 may add the one or more words included in the proxy UI element corresponding to UI element 1010 (e.g., "current," "font," "change," etc.) to a unified set of words that includes the one or more words associated with local functionality of remote computing platform 502. Utilization of such a unified set of words may provide a user of remote computing platform 502 with a "seamless" speech recognition experience (e.g., from the perspective of the user it may be immaterial whether their words pertain to one or more aspects of a local application, the hosted application, or a combination thereof). At step 8, remote computing platform 502 may capture one or more audio samples. For example, a user of remote computing platform 502 may invoke speech recognition (e.g., using a keyword, via an input device, etc.). The audio sample(s) may include an utterance of the user of remote computing platform 502.

Figure 9B:
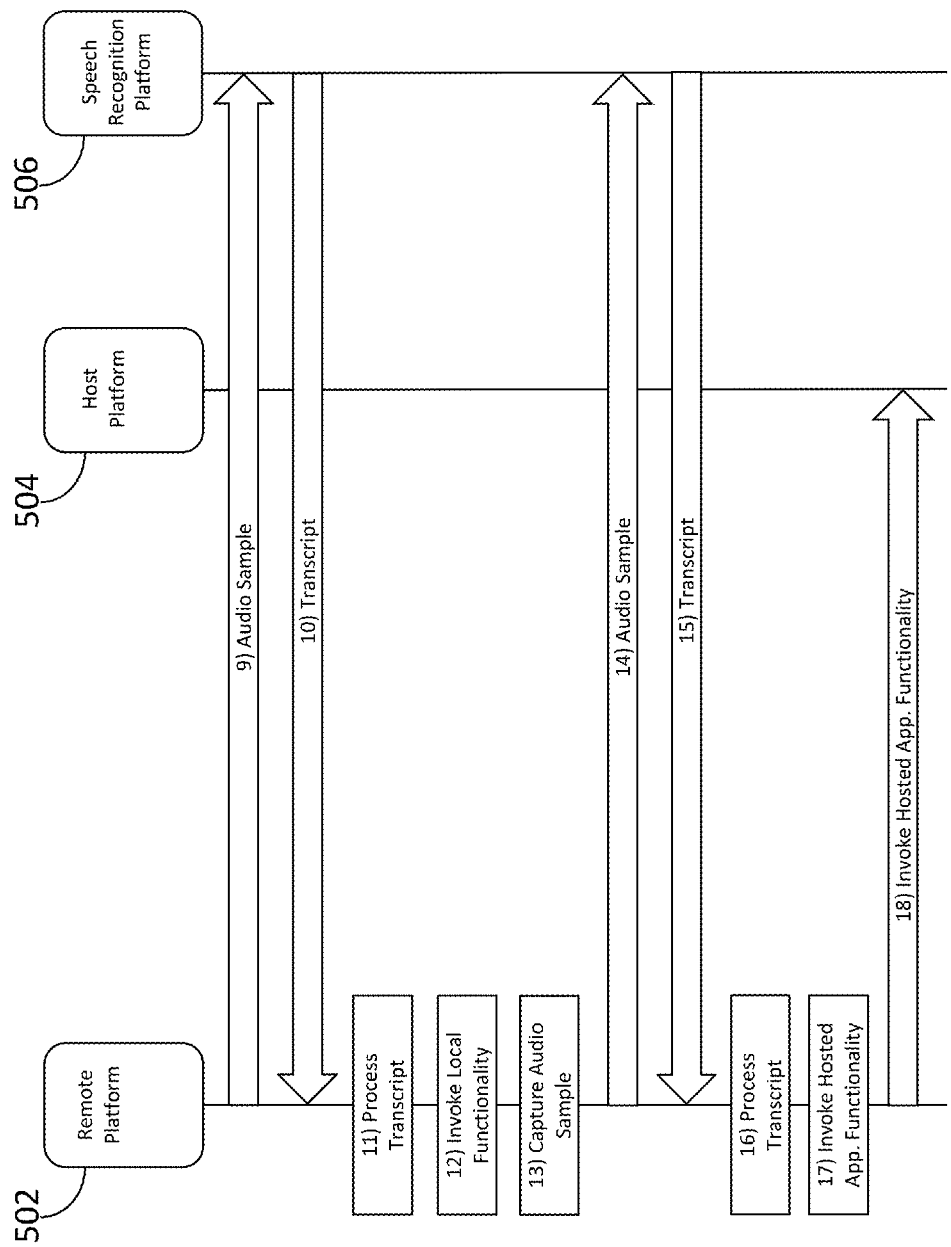

Referring to FIG. 9B, at step 9, the audio sample(s) may be communicated to speech recognition platform 506. Speech recognition platform 506 may utilize speech recognition technology to convert the audio samples into one or more transcripts or computer parseable records, and, at step 10, may communicate such transcript(s) or computer parseable record(s) to remote computing platform 502. For example, speech recognition platform 506 may communicate a transcript of one or more utterances of a user of remote computing platform 502 to remote computing platform 502. At step 11, remote computing platform 502 may process the transcript(s) or computer parseable record(s) received from speech recognition platform 506. For example, remote computing platform 502 may process the transcript of the utterance(s) of the user of remote computing platform 502.

In some embodiments, processing the transcript of the utterance(s) of the user of remote computing platform 502 may include parsing the transcript to identify one or more occurrences of one or more words included in the unified set of words (e.g., parsing the transcript to identify one or more occurrences of one or more words associated with local functionality of remote computing platform 502, one or more occurrences of one or more words associated with applications executed locally on remote computing platform 502, and/or one or more occurrences of one or more words included in the proxy UI element(s) received from host computing platform 504). For example, the user of remote computing platform 502 may have spoken an utterance that included words associated with functionality of local UI element 1002 (e.g., "place a new call"), and remote computing platform 502 may parse the transcript received from speech recognition platform 506 and identify the words "place a new call" within the transcript. Remote computing platform 502 may determine that the identified words are associated with functionality of remote computing platform 502 or one or more applications executed locally on remote computing platform 502 (e.g., functionality associated with local UI element 1002 or functionality associated with receiver application window 1004, created by receiver module 514), and, at step 12, remote computing platform 502 may invoke the corresponding functionality of remote computing platform 502 or one or more applications executed locally on remote computing platform 502 (e.g., functionality associated with local UI element 1002 or functionality associated with receiver application window 1004, created by receiver module 514).

At step 13, remote computing platform 502 may capture one or more additional audio samples. For example, a user of remote computing platform 502 may invoke speech recognition (e.g., using a keyword, via an input device, etc.). The audio sample(s) may include an utterance of the user of remote computing platform 502. At step 14, the audio sample(s) may be communicated to speech recognition platform 506. Speech recognition platform 506 may utilize speech recognition technology to convert the audio samples into one or more transcripts or computer parseable records, and, at step 15, may communicate such transcript(s) or computer parseable record(s) to remote computing platform 502. For example, speech recognition platform 506 may communicate a transcript of one or more utterances of a user of remote computing platform 502 to remote computing platform 502. At step 16, remote computing platform 502 may process the transcript(s) or computer parseable record (s) received from speech recognition platform 506. For example, the user of remote computing platform 502 may have spoken an utterance that included words associated with functionality of UI element 1010 (e.g., "change to a new font"), and remote computing platform 502 may parse the transcript received from speech recognition platform 506 and identify the words "change to a new font" within the transcript. Remote computing platform 502 may determine that the identified words are associated with a proxy UI element (e.g., a proxy UI element corresponding to UI element 1010).

Figure 9C:
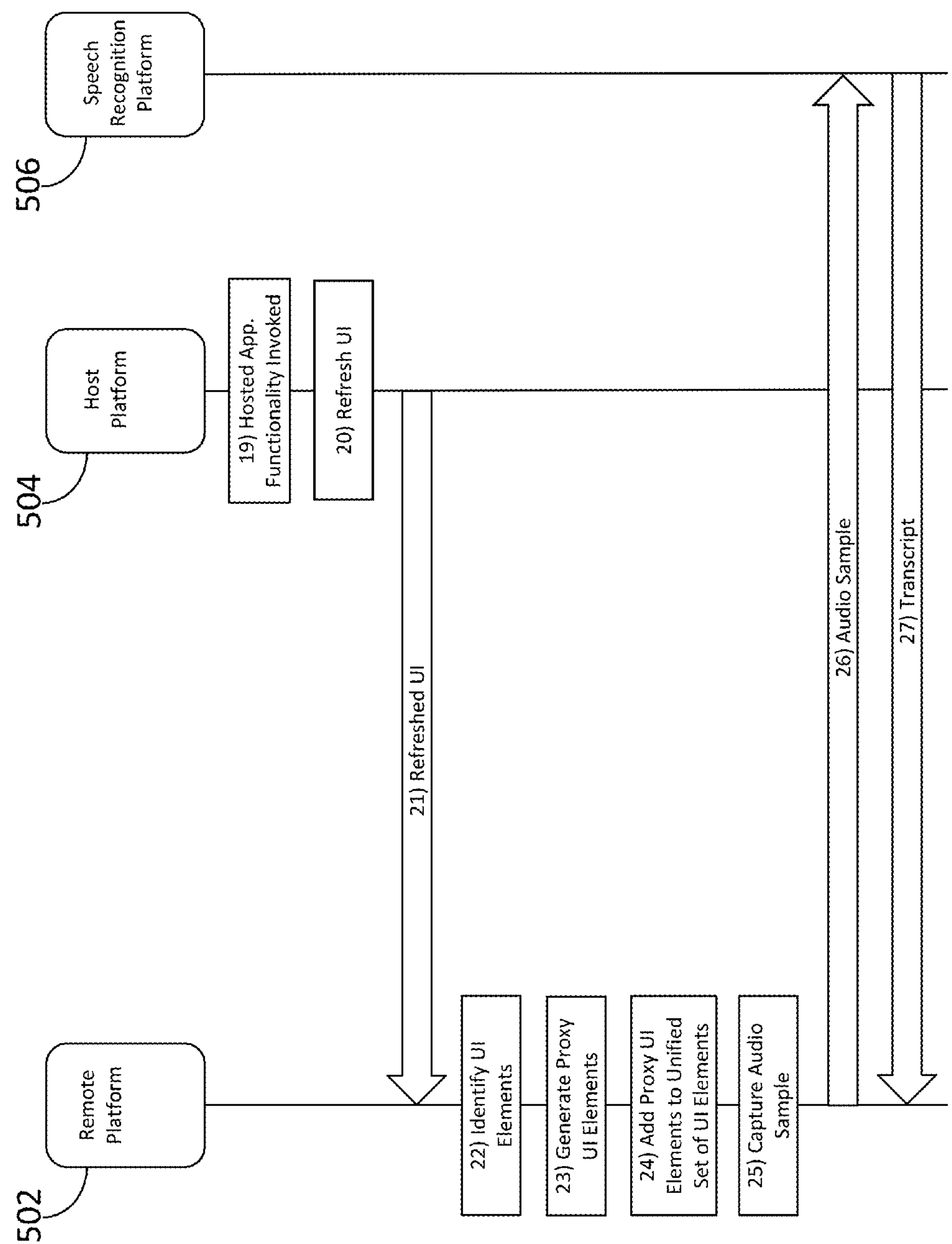

At step 17, remote computing platform 502 may invoke functionality of the UI element corresponding to the proxy UI element for which the identified words are associated. For example, remote computing platform 502 may invoke the functionality of UI element 1010 (e.g., change the current font). At step 18, remote computing platform 502 may signal host computing platform 504 to invoke the functionality of the UI element corresponding to the proxy UI element for which the identified words are associated. For example, remote computing platform 502 may signal host computing platform 504 to invoke the functionality of UI element 1010. Referring to FIG. 9C, at step 19, host computing platform 504 may invoke the functionality of the UI element corresponding to the proxy UI element for which the identified words are associated. For example, host computing platform 504 may invoke the functionality of UI element 1010. At step 20, host computing platform 504 may refresh the UI associated with the hosted application. For example, host computing platform 504 may refresh hosted application UI 1008 (e.g., to reflect the newly selected font). At step 21, the refreshed UI associated with the hosted application may be communicated to remote computing platform 502. For example, the refreshed hosted application UI 1008 (e.g., a version reflecting the newly selected font) may be communicated to remote computing platform 502.

As indicated above, one or more aspects of UI module 520's functionality described herein may be combined with one or more other modules or performed by one or more separate modules, which may be executed on any combination of computing platforms (e.g., remote computing platform 502, host computing platform 504, or a combination thereof). For example, at step 22, remote computing platform 502 may identify one or more UI elements of the refreshed UI. For example, remote computing platform 502 may identify UI element 1010 (e.g., the newly selected font). At step 23, remote computing platform 502 may generate one or more proxy UI elements. Each of the proxy UI elements may correspond to one or more of the identified UI elements. For example, remote computing platform 502 may generate one or more proxy UI elements corresponding to UI element 1010 (e.g., one or more proxy UI elements corresponding to the newly selected font). Each of the generated proxy UI elements may comprise one or more words associated with functionality corresponding to the identified UI element(s) with which it corresponds. For example, the proxy UI element(s) corresponding to UI element 1010 may comprise one or more words associated with functionality corresponding to UI element 1010 (e.g., one or more words associated with the newly selected font).

At step 24, remote computing platform 502 may add the one or more words included in the generated proxy UI element(s) to the unified set of words. For example, remote computing platform 502 may add the one or more words included in the proxy UI element corresponding to UI element 1010 (e.g., the one or more words associated with the newly selected font) to the unified set of words. At step 25, remote computing platform 502 may capture one or more additional audio samples. For example, a user of remote computing platform 502 may invoke speech recognition (e.g., using a keyword, via an input device, etc.). The audio sample(s) may include an utterance of the user of remote computing platform 502. At step 26, the audio sample(s) may be communicated to speech recognition platform 506. Speech recognition platform 506 may utilize speech recognition technology to convert the audio samples into one or more transcripts or computer parseable records, and, at step 27, may communicate such transcript(s) or computer parseable record(s) to remote computing platform 502. For example, speech recognition platform 506 may communicate a transcript of one or more utterances of a user of remote computing platform 502 to remote computing platform 502.

Figure 9D:
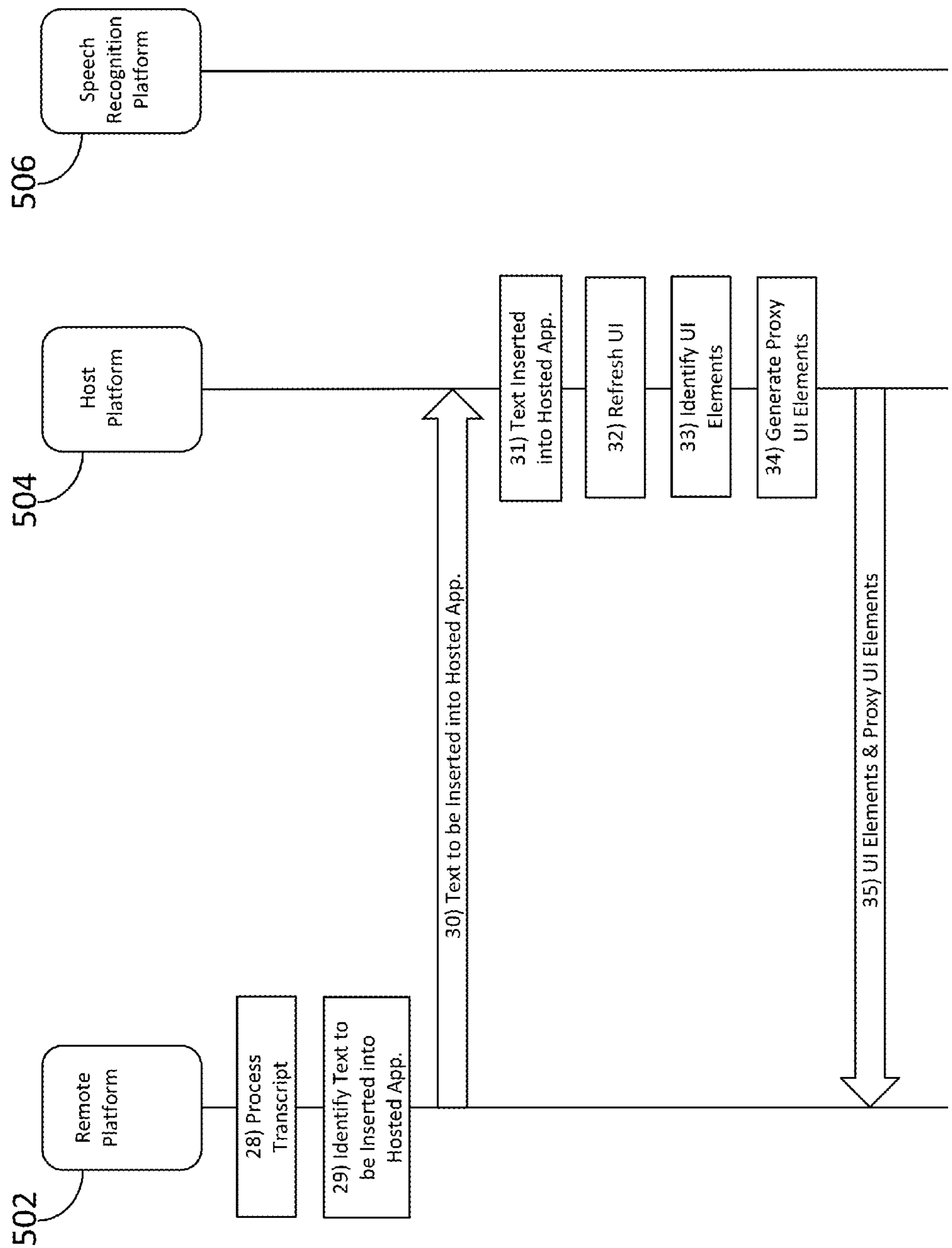

Referring to FIG. 9D, at step 28, remote computing platform 502 may process the transcript(s) or computer parseable record(s) received from speech recognition platform 506. For example, the user of remote computing platform 502 may have spoken an utterance that included text to be inserted into the hosted application (e.g., "hello <pause> this is a test period a test performed over a remote connection exclamation mark"). Remote computing platform 502 may parse the transcript received from speech recognition platform 506 and, at step 29, may identify within the transcript the text to be inserted into the hosted application. In some embodiments, remote computing platform 502 may polish the text to be inserted into the hosted application (e.g., producing a text string such as "Hello, this is a test. A test performed over a remote connection!"). At step 30, remote computing platform 502 may communicate the text to be inserted into the hosted application to host computing platform 504. At step 31, host computing platform 504 may insert the text to be inserted into the hosted application into the hosted application. For example, host computing platform 504 may insert text 1012 (or a portion thereof) into hosted application UI 1008, and the current cursor position may shift to position 1014.

Figure 9E:
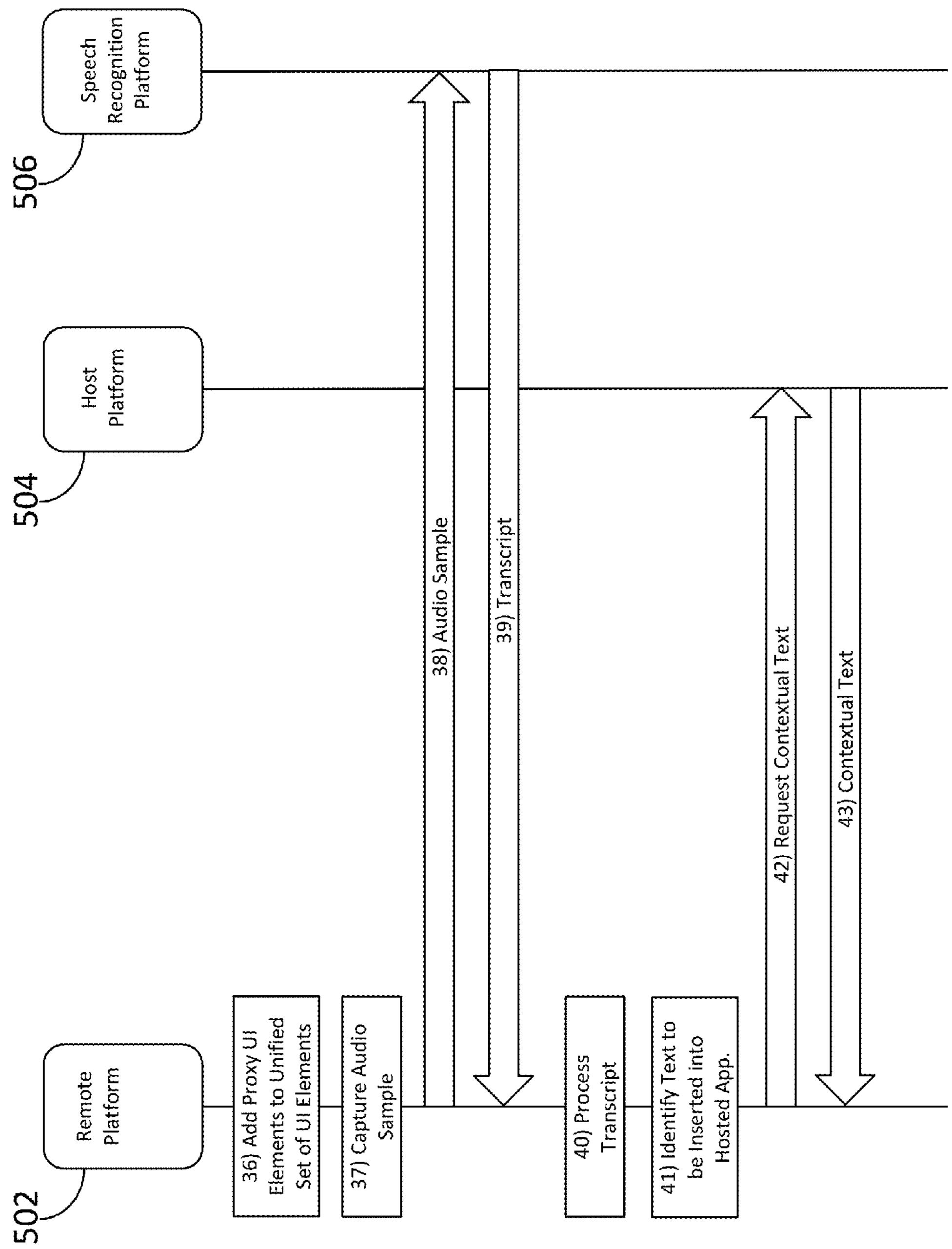

At step 32, host computing platform 504 may refresh the UI associated with the hosted application. For example, host computing platform 504 may refresh hosted application UI 1008 (e.g., to reflect the inserted text and the current cursor position). At step 33, host computing platform 504 may identify one or more UI elements of the refreshed UI. For example, UI module 520 may identify text 1012 and/or cursor position 1014. At step 34, host computing platform 504 may generate one or more proxy UI elements. Each of the proxy UI elements may correspond to one or more of the identified UI elements. For example, UI module 520 may generate one or more proxy UI elements corresponding to text 1012 and/or cursor position 1014. Each of the generated proxy UI elements may comprise one or more words associated with functionality corresponding to the identified UI element(s) with which it corresponds. For example, the proxy UI element(s) corresponding to text 1012 may comprise one or more words contained within text 1012 and the proxy UI element(s) corresponding to cursor position 1014 may comprise one or more words associated with cursor position 1014 (e.g., "after the exclamation mark," "line five," "at the end," etc.). At step 35, the refreshed UI (including the identified UI element(s)) and the proxy UI element(s) may be communicated to remote computing platform 502. For example, the refreshed version of hosted application UI 1008 (including text 1012), and the proxy UI element(s) (not illustrated) corresponding to text 1012 and/or cursor position 1014 may be communicated to remote computing platform 502. Referring to FIG. 9E, at step 36, remote computing platform 502 may add the one or more words included in the generated proxy UI element(s) to the unified set of words. For example, remote computing platform 502 may add the one or more words included in the proxy UI element corresponding to text 1012 and/or the one or more words included in the proxy UI element corresponding to cursor position 1014 to the unified set of words.

At step 37, remote computing platform 502 may capture one or more additional audio samples. For example, a user of remote computing platform 502 may invoke speech recognition (e.g., using a keyword, via an input device, etc.). The audio sample(s) may include an utterance of the user of remote computing platform 502. At step 38, the audio sample(s) may be communicated to speech recognition platform 506. Speech recognition platform 506 may utilize speech recognition technology to convert the audio samples into one or more transcripts or computer parseable records, and, at step 39, may communicate such transcript(s) or computer parseable record(s) to remote computing platform 502. For example, speech recognition platform 506 may communicate a transcript of one or more utterances of a user of remote computing platform 502 to remote computing platform 502. At step 40, remote computing platform 502 may process the transcript(s) or computer parseable record (s) received from speech recognition platform 506. For example, the user of remote computing platform 502 may have spoken an utterance that included text to be inserted into the hosted application (e.g., "insert text this is a test of speech recognition period after this is a test period"). Remote computing platform 502 may parse the transcript received from speech recognition platform 506 and, at step 41, may identify within the transcript the text to be inserted into the hosted application.

In some embodiments, remote computing platform 502 may utilize a sliding window of contextual text to polish the text to be inserted into the hosted application. The sliding window of contextual text may include, for example, text surrounding the current cursor position (e.g., text before and/or after the current cursor position). In the event that a user of remote computing platform 502 indicates that text should be inserted into the hosted application at a position outside the current sliding window of contextual text (e.g., via touch, keyboard, mouse event, changing cursor position, updating content, etc.), remote computing platform 502 may request additional text contained in the hosted application from host computing platform 504. For example, at step 42, remote computing platform 502 may request additional text contained in the hosted application from host computing platform 504 (e.g., text before and/or after the string "This is a test."). Additionally or alternatively, remote computing platform 502 may request new (or refreshed) contextual text (e.g., responsive to a touch event, keyboard event, cursor moving event, voice command directed toward changing cursor position, updating content, navigating within text, selecting text, searching for text, cut, copy, or paste events, etc.), and/or host computing platform 504 may determine that new (or refreshed) contextual text should be identified (e.g., based on a UI automation event, API event, etc.). Host computing platform 504 may identify the requested contextual text (e.g., the text before and/or after the string "This is a test."). At step 43, host computing platform 504 may communicate the requested contextual text to remote computing platform 502 (e.g., the text string "Hello, this is a test. A test performed over a remote connection!"). Additionally or alternatively, the contextual text may be identified and/or communicated to remote computing platform 502 prior to remote computing platform 502 processing the transcript and/or identifying the text to be inserted into the hosted application.

Figure 9F:
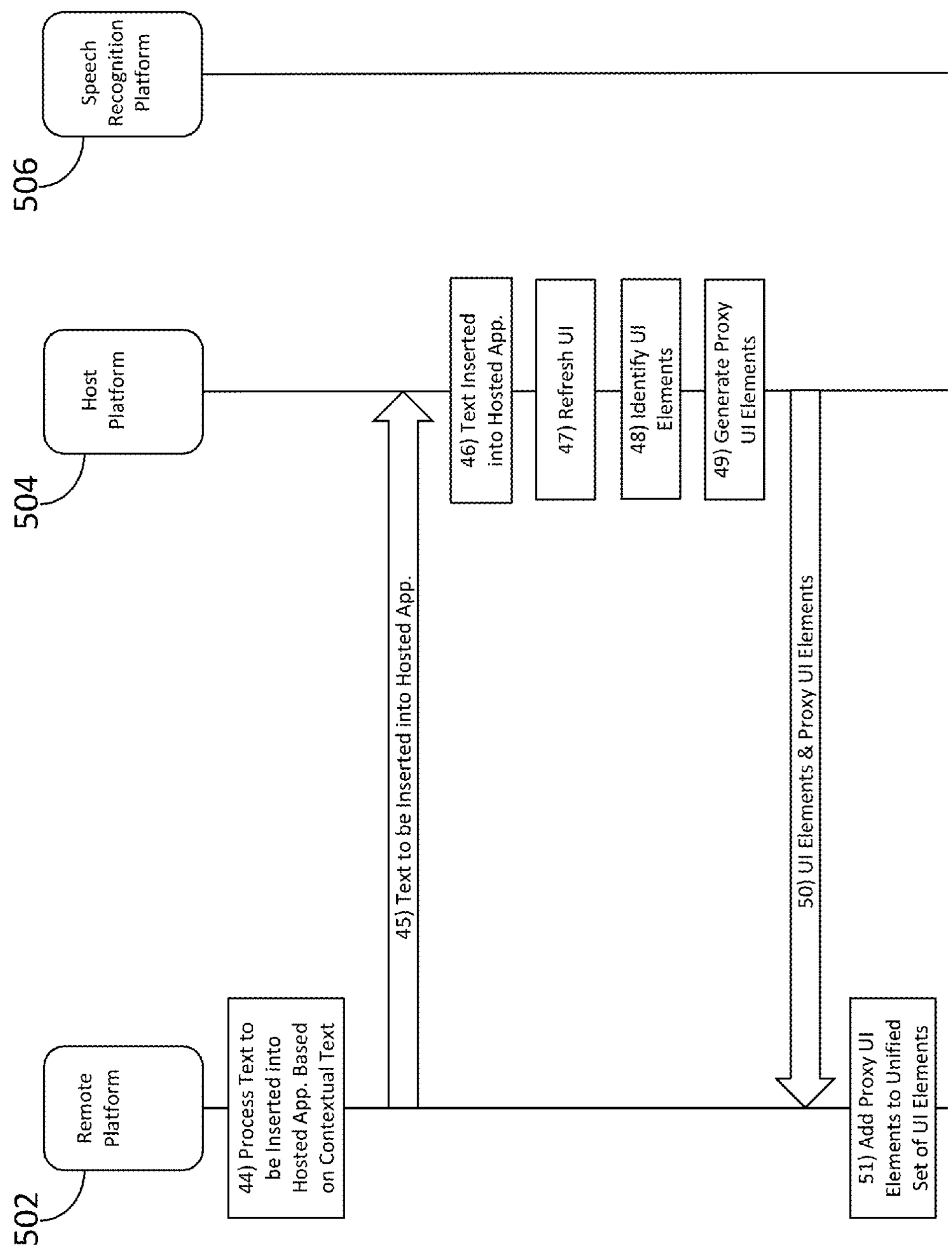

Referring to FIG. 9F, at step 44, remote computing platform 502 may update the sliding window of contextual text with the provided contextual text and process the text to be inserted into the hosted application. For example, remote computing platform 502 may refine the text to be inserted into the hosted application in light of the contextual text (e.g., producing a text string such as "This is a test of speech recognition."). At step 45, remote computing platform 502 may communicate the text to be inserted into the hosted application to host computing platform 504. At step 46, remote computing platform may insert the text to be inserted into the hosted application into the hosted application. For example, host computing platform 504 may insert the text "This is a test of speech recognition." into hosted application UI 1008, and the current cursor position may shift to position 1016.

At step 47, host computing platform 504 may refresh the UI associated with the hosted application. For example, host computing platform 504 may refresh hosted application UI 1008 (e.g., to reflect the inserted text and the current cursor position). At step 48, host computing platform 504 may identify one or more UI elements of the refreshed UI. For example, UI module 520 may identify the newly inserted text and/or cursor position 1016. At step 49, host computing platform 504 may generate one or more proxy UI elements. Each of the proxy UI elements may correspond to one or more of the identified UI elements. For example, UI module 520 may generate one or more proxy UI elements corresponding to the newly inserted text and/or cursor position 1016. Each of the generated proxy UI elements may comprise one or more words associated with functionality corresponding to the identified UI element(s) with which it corresponds. For example, the proxy UI element(s) corresponding to the newly inserted text may comprise one or more words contained within the newly inserted text and the proxy UI element(s) corresponding to cursor position 1016 may comprise one or more words associated with cursor position 1016.

At step 50, the refreshed UI (including the identified UI element(s)) and the proxy UI element(s) may be communicated to remote computing platform 502. For example, the refreshed version of hosted application UI 1008 (including the newly inserted text), and the proxy UI element(s) (not illustrated) corresponding to the newly inserted text and/or cursor position 1016 may be communicated to remote computing platform 502. At step 51, remote computing platform 502 may add the one or more words included in the generated proxy UI element(s) to the unified set of words. For example, remote computing platform 502 may add the one or more words included in the proxy UI element corresponding to the newly inserted text and/or the one or more words included in the proxy UI element corresponding to cursor position 1016 to the unified set of words.

FIG. 11 depicts an example method for speech recognition support for remote applications and desktops in accordance with one or more illustrative aspects described herein. Referring to FIG. 11, at step 1100, an application may be hosted for utilization by a remote computing platform. For example, an end-user application supported by hosted application module 518 may be hosted by host computing platform 504 for utilization by remote computing platform 502 (e.g., via receiver module 514). At step 1102, UI elements of a UI generated by the hosted application may be identified. For example, UI elements 702, 704, 706, 708, and 710 of UI 700 may be identified by UI module 520. At step 1104, proxy UI elements may be generated. Each of the proxy UI elements may correspond to one or more of the identified UI elements. For example, UI module 520 may generate proxy UI elements 712, 714, 716, and 718. Proxy UI elements 712, 714, 716, and 718 may correspond to UI elements 704, 706, 708, and 704, respectively. At step 1106, a transcript of an audio sample may be processed. For example, host computing platform 504 may process a transcript of an audio sample recorded by remote computing platform 502. The audio sample recorded by remote computing platform 502 may include an utterance by a user of remote computing platform 502. The transcript may include one or more words corresponding to one or more of the proxy UI elements. For example, the transcript may include the word "one," which may correspond to proxy UI element 712. At step 1108, a functionality of the hosted application may be invoked. For example, host computing platform 504 may select UI element 704, corresponding to proxy UI element 712.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

What is claimed is:

1. A method, comprising:

hosting an application for utilization by a remote computing platform;

identifying a plurality of UI elements of a graphical user interface (UI) generated by the hosted application;

generating a plurality of proxy UI elements, each of the plurality of proxy UI elements corresponding to one or more of the plurality of UI elements;

transmitting, to the remote computing platform, the graphical UI generated by the hosted application and the plurality of proxy UI elements;

processing a transcript of an audio sample, the audio sample comprising an utterance of a user of the remote computing platform, and the transcript of the audio sample comprising at least one word corresponding to one or more of the plurality of proxy UI elements;

invoking a functionality of the hosted application, said functionality corresponding to one or more of the plurality of UI elements that correspond to the one or more of the plurality of proxy UI elements;

identifying a plurality of properties of the plurality of UI elements and generating the plurality of proxy UI elements based on the identified plurality of properties, wherein each respective proxy UI element of the plurality of proxy UI elements is associated with one or more words corresponding to one or more of the plurality of properties, the one or more of the plurality of properties corresponding to one or more of the UI elements that correspond to the respective proxy UI element; and wherein the plurality of properties comprise one or more UI element labels of a labeled UI element of the plurality of UI elements, wherein the at least one word corresponding to one or more of the plurality of proxy UI elements comprises a word corresponding to at least one of the one or more UI element labels of the labeled UI element, and wherein invoking the functionality of the hosted application comprises changing a currently selected UI element of the hosted application from the currently selected UI element of the hosted application to the labeled UI element.

2. The method of claim 1, wherein the transcript of the audio sample comprises text to be inserted in a field of the graphical UI generated by the hosted application, and wherein the method further comprises inserting the text into the field of the graphical UI generated by the hosted application.

3. The method of claim 2, comprising:

identifying contextual text corresponding to a position in the field of the graphical UI generated by the hosted application, said position corresponding to a location of the field where the text is to be inserted;

communicating the contextual text to the remote computing platform;

updating a sliding window stored at the remote computing platform with the contextual text; and prior to the text to be inserted being inserted, using the sliding window to refine the text to be inserted.

4. The method of claim 1, comprising updating a unified set of words stored at the remote computing platform, the unified set of words comprising at least one word corresponding to a speech recognition functionality of an application or program executed locally on the remote computing platform, and the unified set of words comprising the at least one word corresponding to the one or more of the plurality of proxy UI elements.

5. The method of claim 1, wherein the transcript of the audio sample is received from a speech recognition computing platform, the speech recognition computing platform being distinct from the remote computing platform and a computing platform hosting the hosted application.

6. The method of claim 1, wherein at least a portion of the plurality of proxy UI elements are configured to be visible to the user of the remote computing platform, wherein one or more of the at least a portion of the plurality of proxy UI elements that are configured to be visible to the user of the remote computing platform comprise one or more visual cues configured to be overlaid on one or more of the plurality of UI elements of the graphical UI generated by the hosted application, and wherein the at least one word corresponding to the one or more of the plurality of proxy UI elements comprises at least one word corresponding to the one or more visual cues.

7. The method of claim 1, wherein at least a portion of the plurality of proxy UI elements are configured to be visible to the user of the remote computing platform, wherein one or more of the at least a portion of the plurality of proxy UI elements that are configured to be visible to the user of the remote computing platform comprise a cursor targeting reticle configured to be overlaid on one or more of the plurality of UI elements of the graphical UI generated by the hosted application, and wherein the at least one word corresponding to the one or more of the plurality of proxy UI elements comprises at least one word for directing movement of the cursor targeting reticle.

8. The method of claim 1, wherein at least a portion of the plurality of proxy UI elements are configured to be hidden from view of the user of the remote computing platform, wherein one or more of the at least a portion of the plurality of proxy UI elements that are configured to be hidden from view of the user of the remote computing platform comprises one or more cursor direction options, and wherein the at least one word corresponding to the one or more of the plurality of proxy UI elements comprises at least one word corresponding to one or more of the cursor direction options.

9. The method of claim 1, wherein at least a portion of the plurality of proxy UI elements are configured to be hidden from view of the user of the remote computing platform, wherein one or more of the at least a portion of the plurality of proxy UI elements that are configured to be hidden from view of the user of the remote computing platform comprises one or more macro options configured to invoke a series of commands associated with the hosted application, wherein the at least one word corresponding to the one or more of the plurality of proxy UI elements comprises at least one word associated with the one or more macro options, and wherein invoking the functionality of the hosted application comprises invoking the series of commands.

10. The method of claim 1, wherein at least a portion of the plurality of proxy UI elements are configured to be hidden from view of the user of the remote computing platform, wherein one or more of the at least a portion of the plurality of proxy UI elements that are configured to be hidden from view of the user of the remote computing platform comprises one or more keyboard shortcut options configured to invoke a series of commands associated with the hosted application, wherein the at least one word corresponding to the one or more of the plurality of proxy UI elements comprises at least one word associated with the one or more keyboard shortcut options, and wherein invoking the functionality of the hosted application comprises invoking the series of commands.

11. The method of claim 1, wherein at least a portion of the plurality of proxy UI elements are configured to be hidden from view of the user of the remote computing platform, wherein one or more of the at least a portion of the plurality of proxy UI elements that are configured to be hidden from view of the user of the remote computing platform comprises a navigation menu option, the navigation menu option being configured to show one or more navigation options available from a UI state of the hosted application currently being displayed by the remote computing platform, wherein the at least one word corresponding to the one or more of the plurality of proxy UI elements comprises at least one word corresponding to the navigation menu option, and wherein invoking the functionality of the hosted application comprises navigating the hosted application to one of the one or more navigation options.

12. The method of claim 1, wherein the hosted application is run within a virtualized computing environment of a virtualization platform, and wherein the remote computing platform accesses the virtualized computing environment via a receiver application executed on the remote computing platform.

13. The method of claim 12, wherein one or more of the hosted application and the receiver application comprises at least one of a web browser or a web browser plugin, and wherein identifying the plurality of UI elements comprises making at least one call to a browser helper object (BHO) of the at least one of the web browser or the web browser plugin.

14. The method of claim 1, comprising:

detecting one or more changes in the plurality of UI elements; and responsive to detecting the one or more changes in the plurality of UI elements, generating a second plurality of proxy UI elements, each of the second plurality of proxy UI elements corresponding to at least one of the one or more detected changes in the plurality of UI elements.

15. A system, comprising:

at least one processor; and at least one memory storing instructions that, when executed by the at least one processor, cause the system to:

host an application for utilization by a remote computing platform;

identify a plurality of UI elements of a graphical user interface (UI) generated by the hosted application;

generate a plurality of proxy UI elements, each of the plurality of proxy UI elements corresponding to one or more of the plurality of UI elements;

transmit, to the remote computing platform, the graphical UI generated by the hosted application and the plurality of proxy UI elements;

process a transcript of an audio sample, the audio sample comprising an utterance of a user of the remote computing platform, and the transcript of the audio sample comprising at least one word corresponding to one or more of the plurality of proxy UI elements;

invoke a functionality of the hosted application, said functionality corresponding to one or more of the plurality of UI elements that correspond to the one or more of the plurality of proxy UI elements;

identifying a plurality of properties of the plurality of UI elements and generating the plurality of proxy UI elements based on the identified plurality of properties, wherein each respective proxy UI element of the plurality of proxy UI elements is associated with one or more words corresponding to one or more of the plurality of properties, the one or more of the plurality of properties corresponding to one or more of the UI elements that correspond to the respective proxy UI element; and wherein the plurality of properties comprise one or more UI element labels of a labeled UI element of the plurality of UI elements, wherein the at least one word corresponding to one or more of the plurality of proxy UI elements comprises a word corresponding to at least one of the one or more UI element labels of the labeled UI element, and wherein invoking the functionality of the hosted application comprises changing a currently selected UI element of the hosted application from the currently selected UI element of the hosted application to the labeled UI element.

16. One or more non-transitory computer-readable media having instructions stored thereon, that when executed by one or more computers, cause the one or more computers to:

host an application for utilization by a remote computing platform;

identify a plurality of UI elements of a graphical user interface (UI) generated by the hosted application;

generate a plurality of proxy UI elements, each of the plurality of proxy UI elements corresponding to one or more of the plurality of UI elements;

transmit, to the remote computing platform, the graphical UI generated by the hosted application and the plurality of proxy UI elements process a transcript of an audio sample, the audio sample comprising an utterance of a user of the remote computing platform, and the transcript of the audio sample comprising at least one word corresponding to one or more of the plurality of proxy UI elements;

invoke a functionality of the hosted application, said functionality corresponding to one or more of the plurality of UI elements that correspond to the one or more of the plurality of proxy UI elements;

identifying a plurality of properties of the plurality of UI elements and generating the plurality of proxy UI elements based on the identified plurality of properties, wherein each respective proxy UI element of the plurality of proxy UI elements is associated with one or more words corresponding to one or more of the plurality of properties, the one or more of the plurality of properties corresponding to one or more of the UI elements that correspond to the respective proxy UI element; and wherein the plurality of properties comprise one or more UI element labels of a labeled UI element of the plurality of UI elements, wherein the at least one word corresponding to one or more of the plurality of proxy UI elements comprises a word corresponding to at least one of the one or more UI element labels of the labeled UI element, and wherein invoking the functionality of the hosted application comprises changing a currently selected UI element of the hosted application from the currently selected UI element of the hosted application to the labeled UI element.

* * * * *